US008040761B2

(12) United States Patent
Kawamori et al.

(10) Patent No.: US 8,040,761 B2
(45) Date of Patent: Oct. 18, 2011

(54) NEAR-FIELD LIGHT GENERATING DEVICE INCLUDING NEAR-FIELD LIGHT GENERATING ELEMENT DISPOSED OVER WAVEGUIDE WITH BUFFER LAYER AND ADHESION LAYER THEREBETWEEN

(75) Inventors: Keita Kawamori, Tokyo (JP); Makoto Isogai, Tokyo (JP); Susumu Aoki, Tokyo (JP); Daisuke Miyauchi, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 289 days.

(21) Appl. No.: 12/457,886

(22) Filed: Jun. 24, 2009

(65) Prior Publication Data

US 2010/0329085 A1    Dec. 30, 2010

(51) Int. Cl.
   *G11B 11/00*   (2006.01)
(52) U.S. Cl. ................ 369/13.33; 369/112.27
(58) Field of Classification Search .......... 369/13.24, 369/13.33, 13.32, 13.13, 13.02, 13.03, 112.27; 427/123, 125; 360/59, 128, 125.12; 385/14, 385/40
See application file for complete search history.

(56) References Cited

U.S. PATENT DOCUMENTS

| 6,649,894 B2 | 11/2003 | Matsumoto et al. |
| 6,768,556 B1 | 7/2004 | Matsumoto et al. |
| 7,330,404 B2 | 2/2008 | Peng et al. |
| 7,397,632 B2 * | 7/2008 | Miyake et al. ........... 360/125.12 |
| 7,454,095 B2 * | 11/2008 | Baehr-Jones et al. ........... 385/14 |
| 7,821,732 B2 * | 10/2010 | Komura et al. ................. 360/59 |
| 7,821,880 B2 * | 10/2010 | Tanaka et al. ............... 369/13.33 |
| 2005/0249451 A1 | 11/2005 | Baehr-Jones et al. |
| 2006/0215315 A1 | 9/2006 | Miyake et al. |
| 2008/0198496 A1 | 8/2008 | Shimazawa et al. |

FOREIGN PATENT DOCUMENTS

| JP | A-2005-116155 | 4/2005 |
| JP | A-2008-164768 | 7/2008 |
| JP | A-2008-257819 | 10/2008 |
| JP | A-2009-7634 | 1/2009 |

OTHER PUBLICATIONS

Hochberg et al., "Integrated plasmon and dielectric waveguides," *Optics Express*, vol. 12, No. 22, Nov. 1, 2004.
Office Action issued May 24, 2011 in counterpart Japanese Patent Application No. 2009-291784 (with English translation).

* cited by examiner

*Primary Examiner* — Ali Neyzari
(74) *Attorney, Agent, or Firm* — Oliff & Berridge, PLC

(57) ABSTRACT

A near-field light generating device includes: a waveguide; a buffer layer disposed on the top surface of the waveguide; an adhesion layer that is formed by incompletely oxidizing a metal layer and disposed on the buffer layer; and a near-field light generating element disposed on the adhesion layer. The adhesion layer has a resistance-area product higher than that of the metal layer unoxidized and lower than that of a layer that is formed by completely oxidizing the metal layer. A layered structure consisting of the buffer layer, the adhesion layer and the near-field light generating element has a peel-test adhesive strength higher than that of a layered structure consisting of the buffer layer and the near-field light generating element.

10 Claims, 13 Drawing Sheets

NEAR-FIELD LIGHT GENERATING DEVICE INCLUDING NEAR-FIELD LIGHT GENERATING ELEMENT DISPOSED OVER WAVEGUIDE WITH BUFFER LAYER AND ADHESION LAYER THEREBETWEEN

BACKGROUND OF THE INVENTION

1. Field of the Invention

The present invention relates to a near-field light generating device for use in heat-assisted magnetic recording where a magnetic recording medium is irradiated with near-field light to lower the coercivity of the magnetic recording medium for data recording, and a method of manufacturing the same, and to a heat-assisted magnetic recording head, a head gimbal assembly, and a magnetic recording device each of which includes the near-field light generating device.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) intended for reading and a recording head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a method so-called heat-assisted magnetic recording. This method uses a recording medium having high coercivity. When recording data, a magnetic field and heat are simultaneously applied to the area of the recording medium where to record data, so that the area rises in temperature and drops in coercivity for data recording. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light. U.S. Pat. Nos. 6,649,894 and 6,768,556 each disclose a method of exciting plasmons by directly irradiating the plasmon antenna with light.

However, a plasmon antenna that is directly irradiated with light to generate near-field light is known to exhibit very low efficiency of conversion of the applied light into near-field light. The energy of the light applied to the plasmon antenna is mostly reflected off the surface of the plasmon antenna, or converted into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the reproducing head located in the medium facing surface to get farther from the magnetic recording medium, thereby causing the problem that a servo signal cannot be read during recording operations.

To cope with this, as described in, for example, U.S. Pat. No. 7,330,404, there has been proposed a technique in which light propagating through a waveguide is not directly applied to a plasmon antenna but is coupled with a near-field light generating element via a buffer layer in a surface plasmon polariton mode to thereby excite surface plasmons on the near-field light generating element. The near-field light generating element has a near-field light generating part which is a sharp-pointed part located in the medium facing surface to generate near-field light. According to this technique, the light propagating through the waveguide is totally reflected at the interface between the waveguide and the buffer layer to generate evanescent light permeating into the buffer layer. The evanescent light and collective oscillations of charges on the near-field light generating element, i.e., surface plasmons, are coupled with each other to excite the surface plasmons on the near-field light generating element. In the near-field light generating element, the excited surface plasmons propagate to the near-field light generating part, and near-field light occurs from the near-field light generating part. According to this technique, since the near-field light generating element is not directly irradiated with the light propagating through the waveguide, it is possible to prevent an excessive increase in temperature of the near-field light generating element.

In order to use the foregoing near-field light generating element and improve the use efficiency of light propagating through the waveguide, it is necessary to match the wave number of the evanescent light with the wave number of surface plasmons to be excited on the near-field light generating element so that the surface plasmons are resonantly excited by the evanescent light. The phenomenon that surface plasmons are resonantly excited by light will hereinafter be referred to as surface plasmon polariton coupling.

The wave number of surface plasmons excited on the near-field light generating element varies according to the material and shape of the near-field light generating element. The selection of the material and shape for the near-field light generating element is thus critical to produce the surface plasmon polariton coupling to improve the use efficiency of the light propagating through the waveguide.

Among known materials of the near-field light generating element that can produce surface plasmon polariton coupling are noble metals such as Ag and Au. For example, Michael Hochberg, Tom Baehr-Jones, Chris Walker & Axel Scherer, "Integrated Plasmon and dielectric waveguides," OPTICS EXPRESS Vol. 12, No. 22, pp. 5481-5486 (2004), and U.S. Patent Application Publication No. 2005/0249451 A1 describe that a waveguide made of Si and a plasmon waveguide (metal waveguide) made of Ag can produce surface plasmon polariton coupling.

Given a near-field light generating device that includes a waveguide, a buffer layer and a near-field light generating element, the layout of the waveguide, the buffer layer and the near-field light generating element may be such that the near-field light generating element is disposed above the top surface of the waveguide with the buffer layer therebetween. In such a case, the near-field light generating device is manufactured by forming the buffer layer on the top surface of the waveguide, and forming the near-field light generating element on the buffer layer. Possible combinations of the materials of the waveguide and the buffer layer include $Ta_2O_5$ or other tantalum oxide as the material of the waveguide and $Al_2O_3$ or $SiO_2$ as the material of the buffer layer.

In the case of forming the near-field light generating element made of a noble metal such as Ag or Au on the buffer layer made of $Al_2O_3$ or $SiO_2$, however, there occurs the problem that the near-field light generating element may exfoliate in the process of manufacturing the near-field light generating device since noble metals such as Ag and Au are low in strength of adhesion to $Al_2O_3$ or $SiO_2$.

To cope with this, an adhesion layer made of metal may be formed on the buffer layer so that the near-field light generating element is formed on the adhesion layer. In this case, the adhesion layer is formed of a metal different from that constituting the near-field light generating element, and the metal is such one that a layered structure consisting of the buffer layer, the adhesion layer and the near-field light generating element has an adhesive strength higher than that of a layered structure consisting of the buffer layer and the near-field light generating element.

If an adhesion layer made of a metal different from that constituting the near-field light generating element is interposed between the buffer layer and the near-field light generating element, however, the surface plasmon polariton coupling will not be produced satisfactorily. This causes the problem of a significant drop in the use efficiency of the light propagating through the wave guide.

JP 2009-7634 A describes the use of a film of a metal such as Cr, Mo or Ti or an oxide film that contains silver and an oxide such as ITO or $TiO_2$ as an adhesion film to be interposed between a substrate and a silver alloy film.

Experiments made by the inventors showed, however, that the exfoliation of the near-field light generating element could not be adequately avoided even when a film of a metal oxide such as $TiO_2$ was formed on the buffer layer and the near-field light generating element made of Ag was disposed on the film.

OBJECT AND SUMMARY OF THE INVENTION

It is an object of the present invention to provide a near-field light generating device and a method of manufacturing the same, the near-field light generating device having a near-field light generating element disposed above a waveguide with a buffer layer and an adhesion layer interposed therebetween, the device being capable of preventing exfoliation of the near-field light generating element and suppressing a drop in the use efficiency of light propagating through the waveguide resulting from the adhesion layer, and to provide a heat-assisted magnetic recording head, a head gimbal assembly and a magnetic recording device each of which includes the near-field light generating device.

A near-field light generating device according to the present invention includes: a waveguide that has a top surface and allows light to propagate therethrough; a buffer layer that has a refractive index lower than that of the waveguide and is disposed on the top surface of the waveguide; an adhesion layer that is formed by incompletely oxidizing a metal layer and is disposed on the buffer layer; and a near-field light generating element disposed on the adhesion layer. The adhesion layer has a resistance-area product higher than that of the metal layer unoxidized and lower than that of a layer that is formed by completely oxidizing the metal layer. A layered structure consisting of the buffer layer, the adhesion layer and the near-field light generating element has a peel-test adhesive strength higher than that of a layered structure consisting of the buffer layer and the near-field light generating element. The near-field light generating element has a coupling part that is opposed to the top surface of the waveguide with the adhesion layer and the buffer layer interposed therebetween, and a near-field light generating part that generates near-field light. A surface plasmon is excited on the coupling part through coupling with evanescent light that occurs from an interface between the waveguide and the buffer layer. The surface plasmon propagates to the near-field light generating part, and the near-field light generating part generates the near-field light based on the surface plasmon.

The "layer that is formed by completely oxidizing a metal layer" refers to a layer that is entirely composed of an oxide of the metal that constitutes the metal layer. In contrast, the "adhesion layer that is formed by incompletely oxidizing a metal layer" according to the present invention is not entirely composed of an oxide of the metal that constitutes the metal layer but contains both the oxide of the metal that constitutes the metal layer and the metal that constitutes the metal layer. The "adhesion layer that is formed by incompletely oxidizing a metal layer," the "layer that is formed by completely oxidizing the metal layer," and the "metal layer unoxidized" are distinguishable from each other by comparing the values of their resistance-area products.

In the near-field light generating device according to the present invention, the near-field light generating element may be made of Ag, Au, or an alloy containing at least one of Ag and Au as a main component, and the adhesion layer may be formed by incompletely oxidizing a metal layer that is made of Ti, Ta, Sn, or an alloy containing at least one of Ti, Ta and Sn as a main component. As employed herein, a main component refers to a component that occupies 50 atomic % or more of the whole.

In the near-field light generating device according to the present invention, the near-field light generating element may have an edge part that includes the coupling part and is long in one direction, and the near-field light generating part may be located at one end of the edge part.

A method of manufacturing the near-field light generating device according to the present invention includes the steps of forming the waveguide; forming the buffer layer on the top surface of the waveguide; forming the metal layer on the buffer layer; incompletely oxidizing the metal layer so that the metal layer turns into the adhesion layer; and forming the near-field light generating element on the adhesion layer.

In the method of manufacturing the near-field light generating device according to the present invention, the near-field light generating element may be made of Ag, Au, or an alloy containing at least one of Ag and Au as a main component, and the adhesion layer may be formed by incompletely oxidizing a metal layer that is made of Ti, Ta, Sn, or an alloy containing at least one of Ti, Ta and Sn as a main component.

A heat-assisted magnetic recording head according to the present invention includes: a medium facing surface that faces a magnetic recording medium; a magnetic pole that has an end face located in the medium facing surface and produces a recording magnetic field for recording data on the magnetic recording medium; and the near-field light generating device according to the present invention. The near-field light generating part is located in the medium facing surface. The near-field light generating device generates near-field light that is to be applied to the magnetic recording medium when data is recorded on the magnetic recording medium using the recording magnetic field.

In the heat-assisted magnetic recording head according to the present invention, the near-field light generating element may be made of Ag, Au, or an alloy containing at least one of Ag and Au as a main component, and the adhesion layer may be formed by incompletely oxidizing a metal layer that is made of Ti, Ta, Sn, or an alloy containing at least one of Ti, Ta and Sn as a main component.

In the heat-assisted magnetic recording head according to the present invention, the near-field light generating element may have an edge part that includes the coupling part and is long in one direction, and the near-field light generating part may be located at one end of the edge part.

A head gimbal assembly according to the present invention includes: the heat-assisted magnetic recording head according to the present invention; and a suspension that supports the heat-assisted magnetic recording head. A magnetic recording device according to the present invention includes: a magnetic recording medium; the heat-assisted magnetic recording head according to the present invention; and a positioning device that supports the heat-assisted magnetic recording head and positions the same with respect to the magnetic recording medium.

According to the near-field light generating device, the method of manufacturing the same, the heat-assisted magnetic recording head, the head gimbal assembly or the magnetic recording device of the present invention, the buffer layer is disposed on the top surface of the waveguide, and the near-field light generating element is disposed over the buffer layer with the adhesion layer interposed therebetween. The adhesion layer is formed by incompletely oxidizing a metal layer. The adhesion layer has a resistance-area product higher than that of the metal layer unoxidized and lower than that of a layer that is formed by completely oxidizing the metal layer. A layered structure consisting of the buffer layer, the adhesion layer and the near-field light generating element has a peel-test adhesive strength higher than that of a layered structure consisting of the buffer layer and the near-field light generating element. According to the present invention, it is thus possible to prevent exfoliation of the near-field light generating element and to suppress a drop in the use efficiency of the light propagating through the waveguide resulting from the adhesion layer as compared with a case where the near-field light generating element is disposed over the buffer layer with an adhesion layer consisting only of metal interposed therebetween.

Other and further objects, features and advantages of the present invention will appear more fully from the following description.

DETAILED DESCRIPTION OF THE PREFERRED EMBODIMENT

Figure 7:
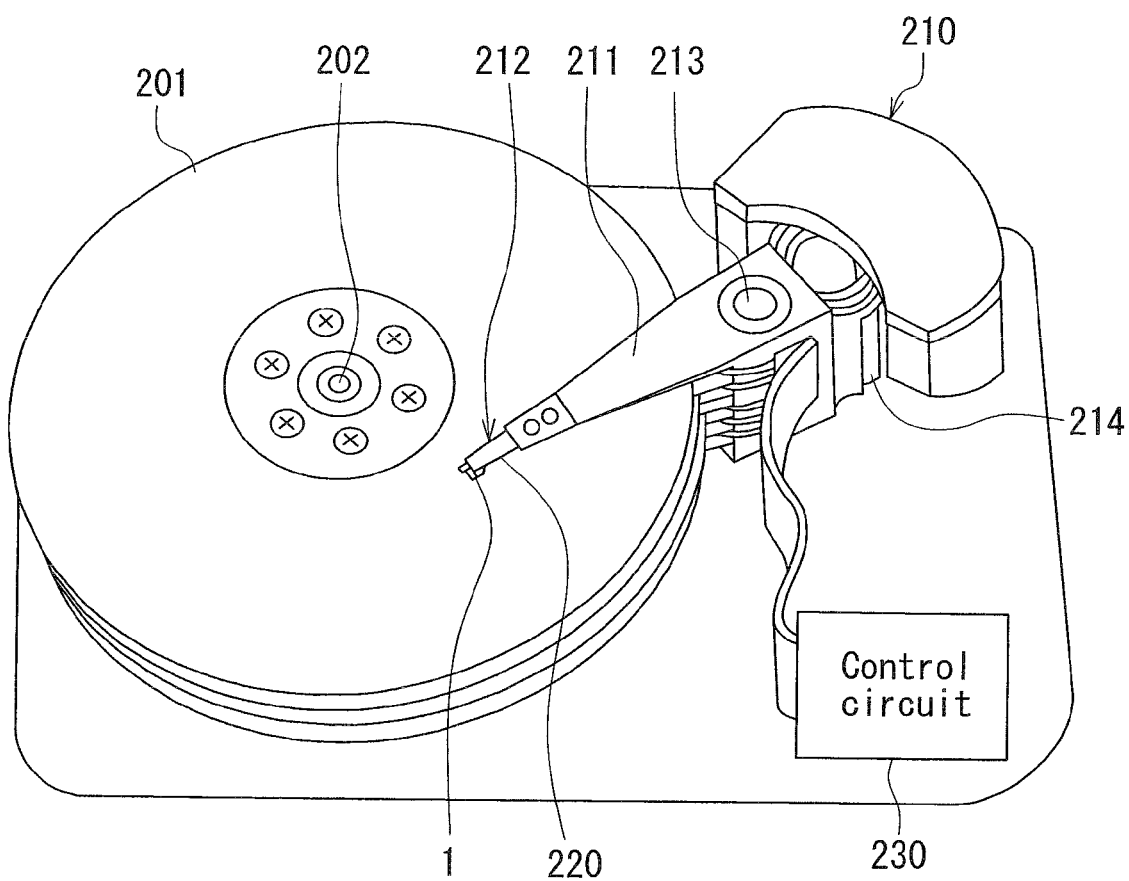
FIG. 7 is a perspective view of a magnetic recording device according to the embodiment of the invention.

A preferred embodiment of the present invention will now be described in detail with reference to the drawings. Reference is first made to FIG. 7 to describe a magnetic disk drive as a magnetic recording device according to the embodiment of the invention. As shown in FIG. 7, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device according to the present invention is not structurally limited to the magnetic disk drive having the above-described configuration. For example, the magnetic recording device according to the present invention may be provided with a single magnetic disk 201, a single driving arm 211, a single head gimbal assembly 212 and a single heat-assisted magnetic recording head 1.

The magnetic disk drive further includes a control circuit 230 for controlling the recording and reproducing operations of the heat-assisted magnetic recording heads 1 and also for controlling the light emitting operation of a laser diode serving as a light source for generating laser light for heat-assisted magnetic recording described later.

Figure 8:
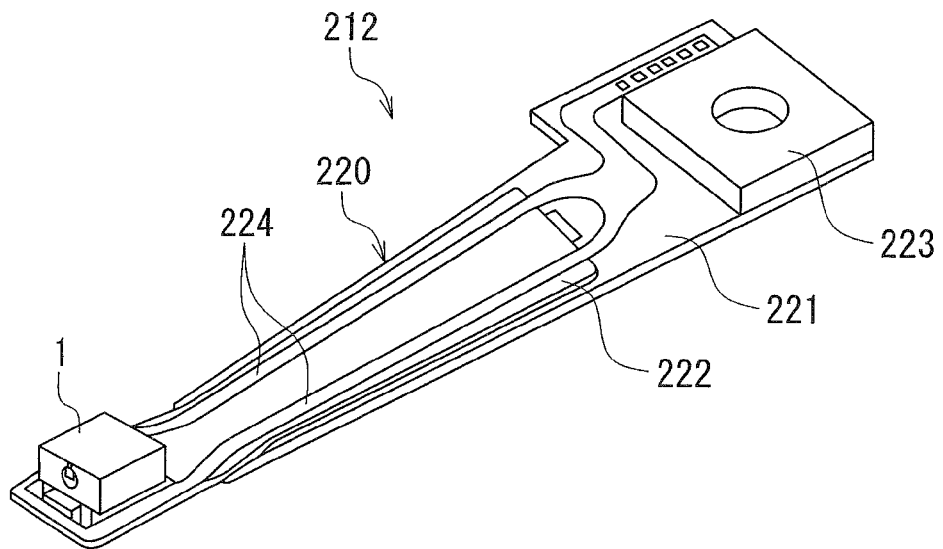
FIG. 8 is a perspective view of a head gimbal assembly according to the embodiment of the invention.

FIG. 8 is a perspective view of the head gimbal assembly 212 of FIG. 7. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged on the base part of the load beam 221.

The assembly carriage device 210 and the suspension 220 correspond to the positioning device according to the present invention. The head gimbal assembly according to the present invention is not limited to the one having the configuration shown in FIG. 8. For example, the head gimbal assembly according to the present invention may have an IC chip for driving the head that is mounted somewhere along the suspension 220.

Figure 9:
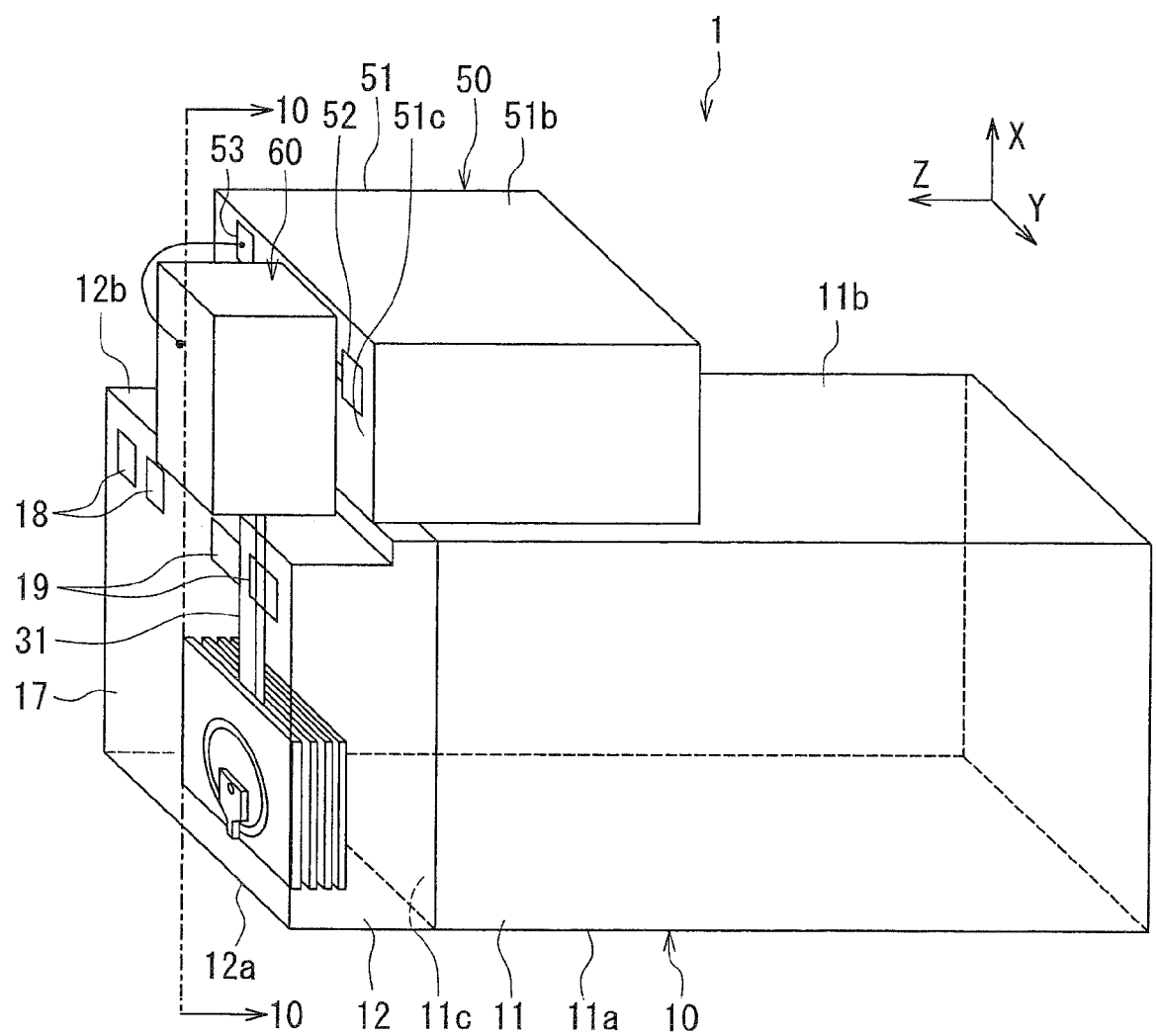
FIG. 9 is a perspective view of the heat-assisted magnetic recording head according to the embodiment of the invention.
Figure 10:
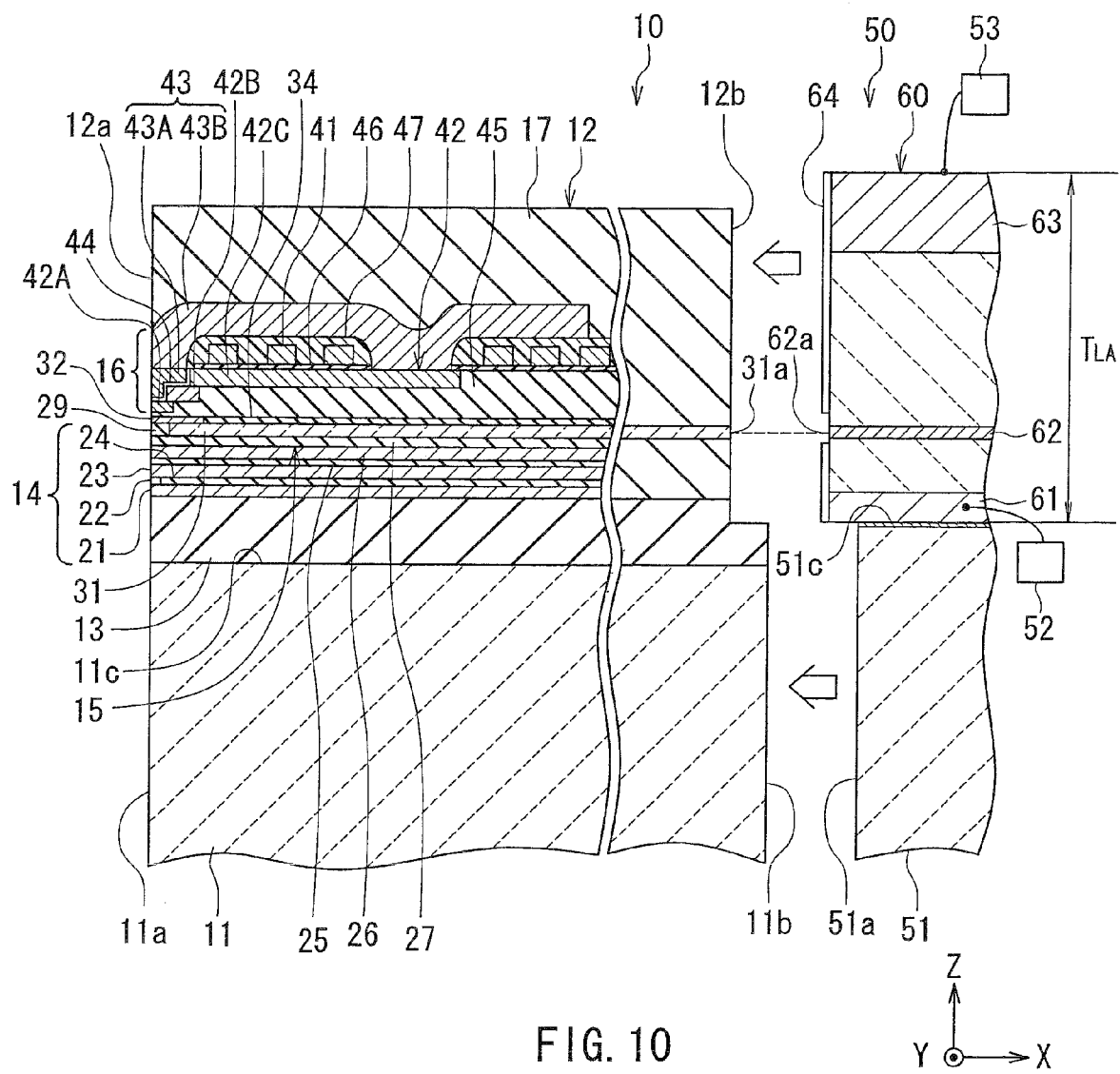
FIG. 10 shows a cross section taken along line 10-10 of FIG. 9.

The configuration of the heat-assisted magnetic recording head 1 according to the present embodiment will now be described with reference to FIG. 9 and FIG. 10. FIG. 9 is a perspective view of the heat-assisted magnetic recording head 1. FIG. 10 shows a cross section taken along line 10-10 of FIG. 9. The heat-assisted magnetic recording head 1 includes a slider 10 and a light source unit 50. FIG. 10 shows the slider 10 and the light source unit 50 in a separated state.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

For the components of the head unit 12, with respect to a reference position, a position located in a direction that is perpendicular to the element-forming surface 11c and gets away from the element-forming surface 11c is defined as "above", and a position located in a direction opposite to the above-mentioned direction is defined as "below". For any of the layers included in the head unit 12, the surface closer to the element-forming surface 11c is defined as a "bottom surface," and the surface farther from the element-forming surface 11c as a "top surface."

Moreover, X direction, Y direction, Z direction, −X direction, −Y direction and −Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 10. The Z direction is a direction perpendicular to the element-forming surface 11c and getting away from the element-forming surface 11c. The −X direction, the −Y direction and the −Z direction are opposite to the X direction, the Y direction and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. A track width direction is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces connecting the bonding surface 51a to the rear surface 51b. One of the four surfaces connecting the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The light-source-mounting surface 51c corresponds to the top surface of the support member of the present invention. The support member 51 may have the function of a heat sink for dissipating heat generated by the laser diode 60, in addition to the function of supporting the laser diode 60.

As shown in FIG. 10, the head unit 12 includes an insulating layer 13 disposed on the element-forming surface 11c, and a reproducing head 14, a near-field light generating device 15, a recording head 16 and a protection layer 17 that are stacked in this order on the insulating layer 13. The insulating layer 13 and the protection layer 17 are each made of an insulating material such as $Al_2O_3$ (hereinafter, also referred to as alumina).

The reproducing head 14 includes: a lower shield layer 21 disposed on the insulating layer 13; an MR element 22 disposed on the lower shield layer 21; an upper shield layer 23 disposed on the MR element 22; and an insulating layer 24 disposed between the lower shield layer 21 and the upper shield layer 23 around the MR element 22. The lower shield layer 21 and the upper shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the lower shield layer 21 and the upper shield layer 23 may also function as electrodes for feeding the sense current to the MR element 22. If the MR element 22 is a CIP-type GMR element, insulating films are respectively provided between the MR element 22 and the lower shield layer 21 and between the MR element 22 and the upper shield layer 23, and two leads are provided between these insulating films in order to feed the sense current to the MR element 22.

The head unit 12 further includes an insulating layer 25 disposed on the upper shield layer 23, and a middle shield layer 26 disposed on the insulating layer 25. The middle shield layer 26 has the function of shielding the MR element 22 from a magnetic field produced in the recording head 16. The insulating layer 25 is made of an insulating material such as alumina. The middle shield layer 26 is made of a soft magnetic material. The insulating layer 25 and the middle shield layer 26 may be omitted.

The near-field light generating device 15 generates near-field light that is to be applied to the magnetic disk 201 when data is recorded on the magnetic disk 201 using a recording magnetic field produced from the recording head 16. The near-field light generating device 15 includes: a dielectric layer 27 disposed on the middle shield layer 26; a waveguide 31 disposed on the dielectric layer 27; a dielectric layer 29 disposed around the waveguide 31 on the dielectric layer 27; a near-field light generating element 32; a buffer layer 33 (not shown in FIG. 10); an adhesion layer 38 (not shown in FIG. 10); and a clad layer 34. The waveguide 31 has an incidence end 31a located in the rear surface 12b of the head unit 12. The configuration of the near-field light generating device 15 will be described in detail later.

The recording head 16 of the present embodiment is for use in perpendicular magnetic recording. The recording head 16 includes a coil 41, a magnetic pole 42, a write shield 43 and a gap layer 44. The coil 41 produces a magnetic field corresponding to data to be recorded on the magnetic disk 201. The magnetic pole 42 has an end face located in the medium facing surface 12a, allows a magnetic flux corresponding to the magnetic field produced by the coil 41 to pass, and produces a recording magnetic field for recording data on the magnetic disk 201 by means of a perpendicular magnetic recording system. The write shield 43 has an end face that is located in the medium facing surface 12a at a position forward of the magnetic pole 42 along the Z direction (in other words, located closer to the trailing end). The gap layer 44 is disposed between the magnetic pole 42 and the write shield 43. The magnetic pole 42 and the write shield 43 are each made of a soft magnetic material. The gap layer 44 is made of a nonmagnetic material. The distance between the end face of the magnetic pole 42 and the end face of the write shield 43 in the medium facing surface 12a falls within the range of 0.01 to 0.5 μm, for example. The gap layer 44 may be made of a nonmagnetic insulating material such as $Al_2O_3$, $SiO_2$, AlN or diamond-like-carbon (DLC), or a nonmagnetic conductive material such as Ru.

The recording head 16 further includes an insulating layer 45 disposed around the magnetic pole 42, and an insulating layer 46 disposed on a part of each of the top surfaces of the magnetic pole 42 and the insulating layer 45. The coil 41 is disposed on the insulating layer 46. The recording head 16 further includes an insulating layer 47 covering the coil 41. The insulating layers 45 and 46 are made of alumina, for example. The insulating layer 47 is made of photoresist, for example. The coil 41 is made of a conductive material such as copper.

A part of the write shield 43 is disposed on the insulating layer 47. The write shield 43 is connected to a part of the top surface of the magnetic pole 42 away from the medium facing surface 12a. The position of the end of a bit pattern to be recorded on the magnetic disk 201 depends on the position of an end of the end face of the magnetic pole 42 located closer to the gap layer 44 in the medium facing surface 12a. The write shield 43 takes in a magnetic flux that is generated from the end face of the magnetic pole 42 located in the medium facing surface 12a and that expands in directions except the direction perpendicular to the plane of the magnetic disk 201, and thereby prevents this magnetic flux from reaching the magnetic disk 201. It is thereby possible to improve the recording density. Furthermore, the write shield 43 takes in a disturbance magnetic field applied from outside the heat-assisted magnetic recording head 1 to the head 1. It is thereby possible to prevent erroneous recording on the magnetic disk 201 caused by the disturbance magnetic field intensively taken into the magnetic pole 42. The write shield 43 further has the function of returning a magnetic flux that has been generated from the end face of the magnetic pole 42 and has magnetized the magnetic disk 201.

As shown in FIG. 10, the protection layer 17 is disposed to cover the recording head 16. As shown in FIG. 9, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 8.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 10, the laser diode 60 has a multilayer structure including a lower electrode 61, an active layer 62 and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 8. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 10. The laser diode 60 and the waveguide 31 are positioned so that the laser light emitted from the laser diode 60 will be incident on the incidence end 31a of the waveguide 31.

Figure 1:
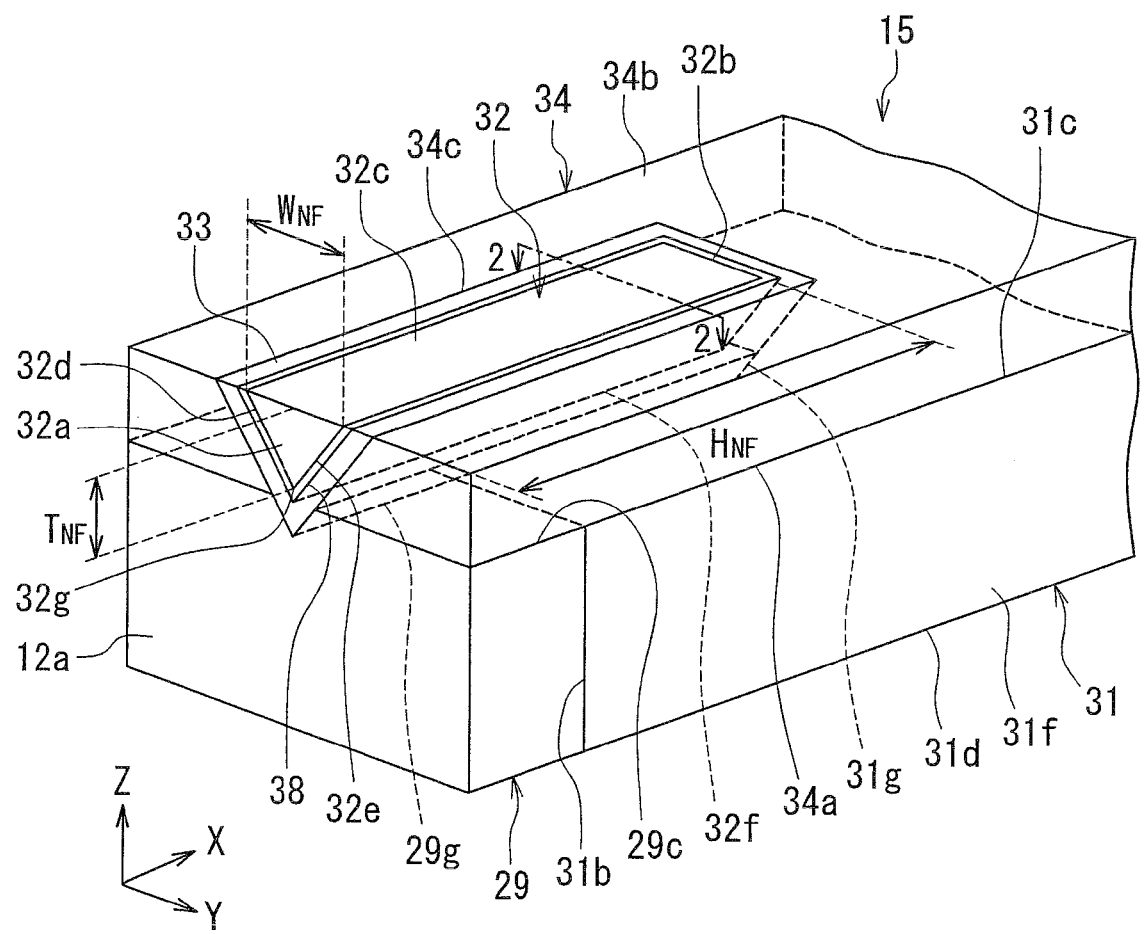
FIG. 1 is a perspective view of a near-field light generating device according to an embodiment of the invention.
Figure 2:
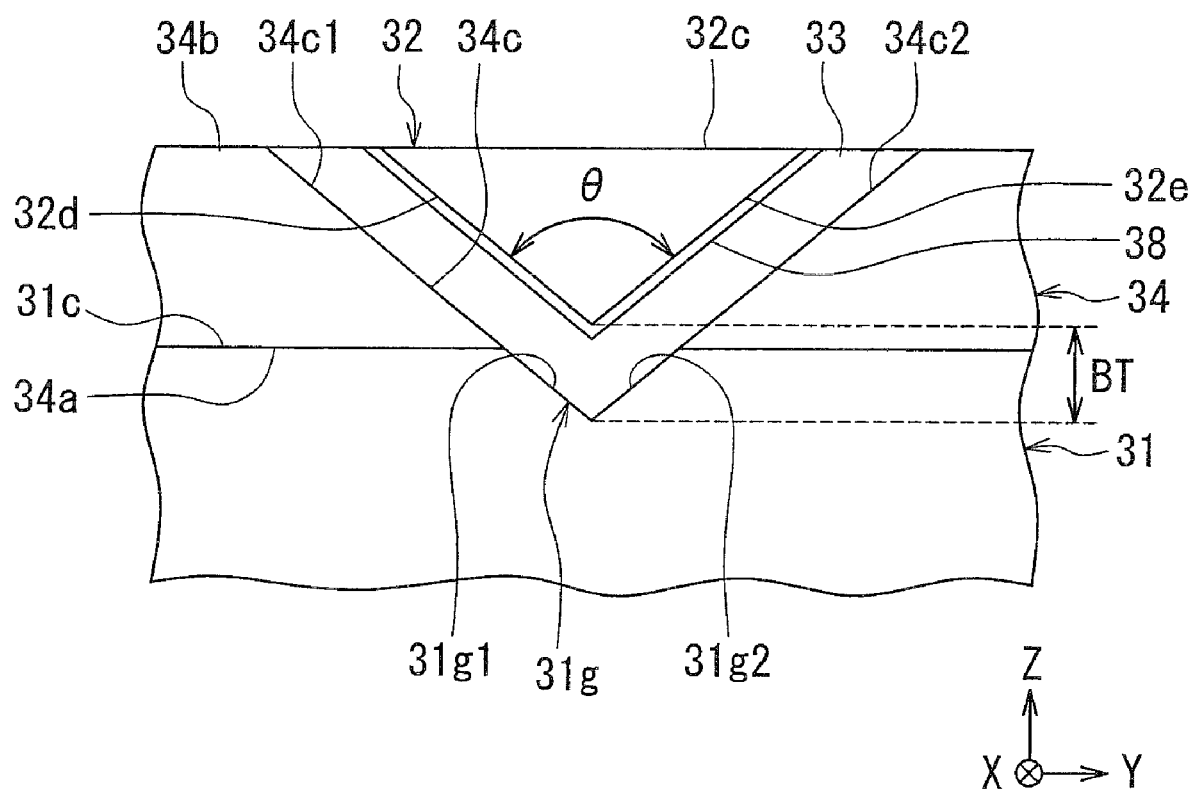
FIG. 2 is a cross-sectional view showing a main part of the near-field light generating device according to the embodiment of the invention.
Figure 3:
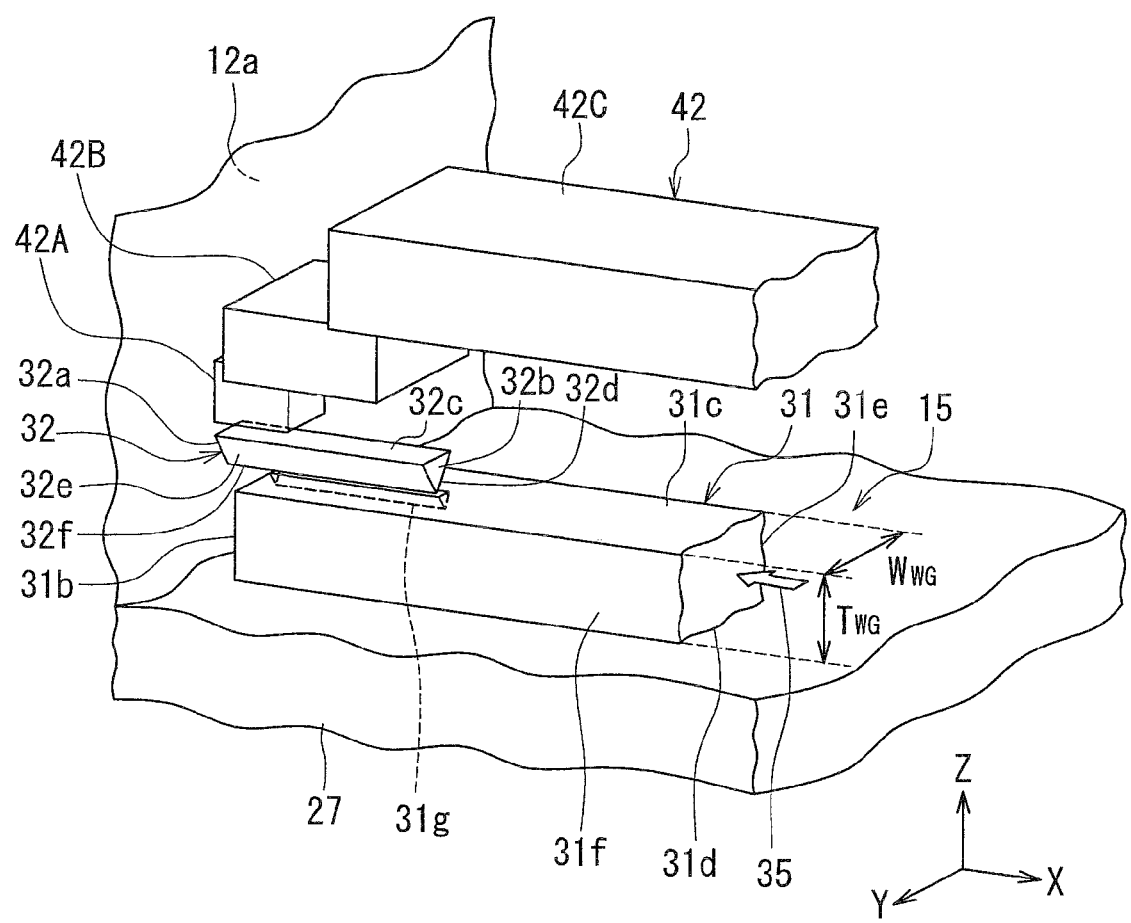
FIG. 3 is a perspective view showing the near-field light generating device and a magnetic pole of a heat-assisted magnetic recording head according to the embodiment of the invention.
Figure 4:
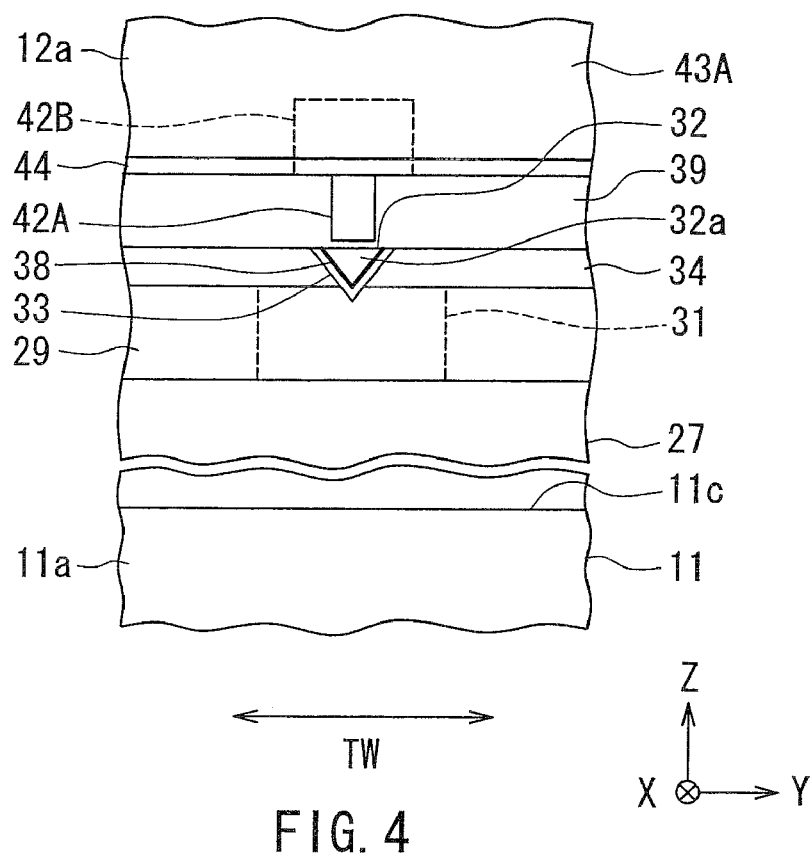
FIG. 4 is a front view showing a part of a medium facing surface of a head unit of the heat-assisted magnetic recording head according to the embodiment of the invention.
Figure 5:
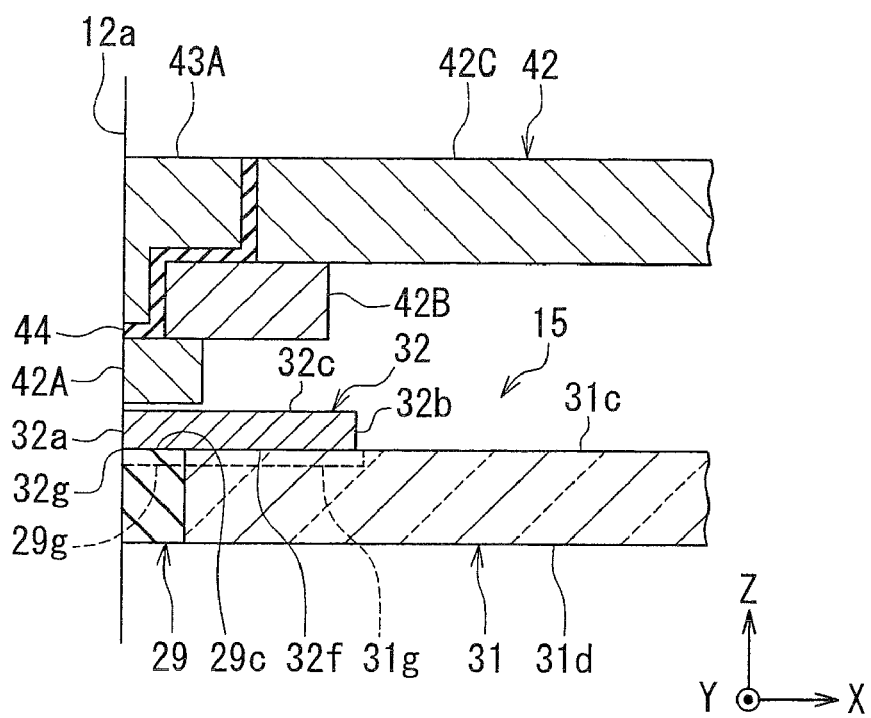
FIG. 5 is a cross-sectional view of the near-field light generating device and the magnetic pole of the heat-assisted magnetic recording head according to the embodiment of the invention.
Figure 6:
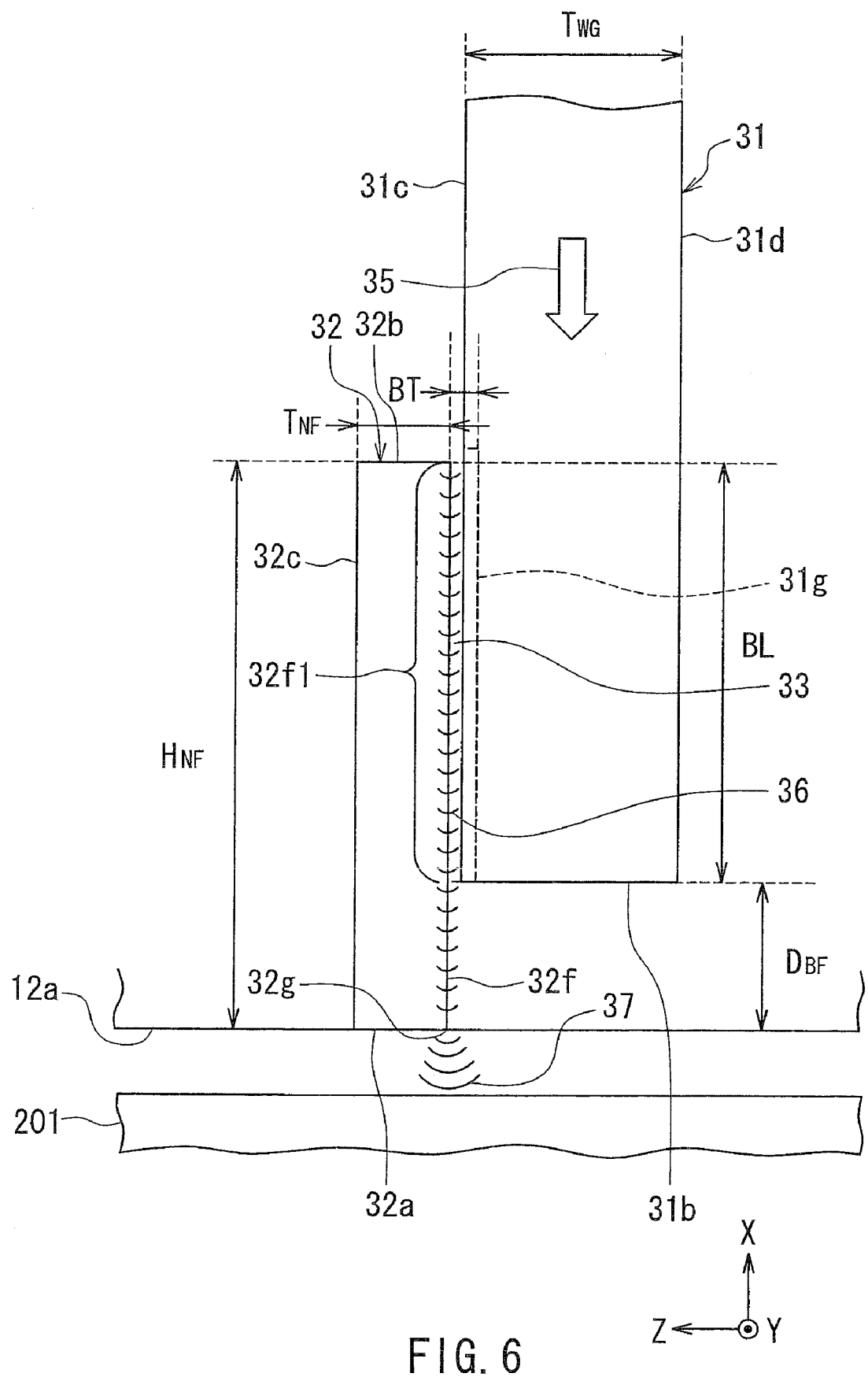
FIG. 6 is an explanatory diagram for explaining the principle of generation of near-field light by the near-field light generating device according to the embodiment of the invention.

The configuration of the near-field light generating device 15 will now be described in detail with reference to FIG. 1 to FIG. 6. FIG. 1 is a perspective view of the near-field light generating device 15. FIG. 2 shows a cross section of the main part of the near-field light generating device 15 taken along line 2-2 of FIG. 1. FIG. 3 is a perspective view showing the near-field light generating device 15 and the magnetic pole 42. FIG. 4 is a front view showing a part of the medium facing surface 12a of the head unit 12. FIG. 5 is a cross-sectional view of the near-field light generating device 15 and the magnetic pole 42. FIG. 6 is an explanatory diagram for explaining the principle of generation of near-field light by the near-field light generating device 15. In FIG. 4 the arrow designated by the symbol TW indicates the track width direction. The track width direction is parallel to the Y direction.

Hereinafter, a description will be given of an example where the near-field light generating element 32 is shaped like a triangular prism. Possible shapes of the near-field light generating element 32 are not limited to a triangular prism shape, however.

The waveguide 31 extends in the direction perpendicular to the medium facing surface 12a (the X direction). The waveguide 31 has: the incidence end 31a shown in FIG. 10; an end face 31b closer to the medium facing surface 12a; a top surface 31c; a bottom surface 31d; and two side surfaces 31e and 31f. The bottom surface 31d is in contact with the top surface of the dielectric layer 27. The dielectric layer 29 disposed around the waveguide 31 has a top surface 29c. The end face 31b may be located in the medium facing surface 12a or away from the medium facing surface 12a. FIG. 1 to FIG. 6 show the case where the end face 31b is located away from the medium facing surface 12a. In this case, a part of the dielectric layer 29 is interposed between the end face 31b and the medium facing surface 12a. The waveguide 31 allows propagation of laser light 35 that is emitted from the laser diode 60 and incident on the incidence end 31a.

As shown in FIG. 1 to FIG. 3, the top surface 31c of the waveguide 31 has a groove 31g that is long in a first direction. The first direction is parallel to the X direction. As shown in FIG. 2, the groove 31g has first and second groove sidewalls 31g1 and 31g2 that decrease in distance from each other toward the element-forming surface 11c.

As shown in FIG. 1, in the case where the end face 31b of the waveguide 31 is located away from the medium facing surface 12a, the top surface 29c of the dielectric layer 29 has a groove 29g that is located in the area between the end face 31b of the waveguide 31 and the medium facing surface 12a and that extends in the first direction (the X direction) so as to be contiguous to the groove 31g. The cross section of the groove 29g parallel to the medium facing surface 12a has the same shape as the cross section of the groove 31g parallel to the medium facing surface 12a. The groove 29g does not exist if the end face 31b of the waveguide 31 is located in the medium facing surface 12a.

As shown in FIG. 1 and FIG. 2, the clad layer 34 has a bottom surface 34a, a top surface 34b, and an opening 34c. The bottom surface 34a is in contact with the top surface 31c of the waveguide 31 and the top surface 29c of the dielectric layer 29. The top surface 34b is opposite to the bottom surface 34a. The opening 34c penetrates the clad layer 34 from the top surface 34b to the bottom surface 34a and is contiguous to the grooves 31g and 29g. As shown in FIG. 2, the opening 34c has first and second opening sidewalls 34c1 and 34c2 that decrease in distance from each other toward the top surface 31c of the waveguide 31. The first groove sidewall 31g1 is contiguous to the first opening sidewall 34c1. The second groove sidewall 31g2 is contiguous to the second opening sidewall 34c2.

As shown in FIG. 1, the near-field light generating element 32 is long in the first direction (the X direction) and is accommodated in the opening 34c at least in part. In the grooves 31g and 29g and the opening 34c, the buffer layer 33 is interposed between the near-field light generating element 32 and each of the waveguide 31, the dielectric layer 29 and the clad layer 34. In the case where the end face 31b of the waveguide 31 is located in the medium facing surface 12a, the groove 29g does not exist and therefore the buffer layer 33 is interposed between the near-field light generating element 32 and each of the waveguide 31 and the clad layer 34 in the groove 31g and the opening 34c. The adhesion layer 38 is interposed between the buffer layer 33 and the near-field light generating element 32. Consequently, the positional relationship among the waveguide 31, the buffer layer 33, the adhesion layer 38 and the near-field light generating element 32 is as follows. The buffer layer 33 is located on the top surface 31c (groove 31g) of the waveguide 31, the adhesion layer 38 is located on the buffer layer 33, and the near-field light generating element 32 is located on the adhesion layer 38.

The near-field light generating element 32 is in the shape of a triangular prism as described below. The near-field light generating element 32 has: a first end face 32a located in the medium facing surface 12a; a second end face 32b opposite to the first end face 32a; a top surface 32c; and first and second side surfaces 32d and 32e. The first side surface 32d is opposed to the first opening sidewall 34c1 with the buffer layer 33 and the adhesion layer 38 therebetween. The first side surface 32d is parallel to or nearly parallel to the first opening sidewall 34c1. The second side surface 32e is opposed to the second opening sidewall 34c2 with the buffer layer 33 and the adhesion layer 38 therebetween. The second side surface 32e is parallel to or nearly parallel to the second opening sidewall 34c2. The first and second side surfaces 32d and 32e decrease in distance from each other toward the groove 31g. As viewed in a cross section parallel to the medium facing surface 12a, the near-field light generating element 32 is in the shape of an isosceles triangle with its vertex downward.

The near-field light generating element 32 further has an edge part 32f and a near-field light generating part 32g. The edge part 32f connects the first and second side surfaces 32d and 32e to each other, and is opposed to the groove 31g with the buffer layer 33 and the adhesion layer 38 therebetween. The near-field light generating part 32g is located in the medium facing surface 12a and generates near-field light. The near-field light generating part 32g lies at one end of the edge part 32f that is located in the medium facing surface 12a. Specifically, the near-field light generating part 32g refers to the end of the edge part 32f in the end face 32a and its vicinity. As shown in FIG. 2, the angle formed between the first side surface 32d and the second side surface 32e will be denoted by the symbol θ. The angle θ falls within the range of 80° to 120°, for example.

The maximum width $W_{NF}$ of the near-field light generating element 32 in the track width direction (the Y direction) and the thickness (dimension in the Z direction) $T_{NF}$ of the near-field light generating element 32 are both sufficiently smaller than the wavelength of the laser light 35. $W_{NF}$ falls within the range of 100 to 300 nm, for example. $T_{NF}$ falls within the range of 60 to 150 nm, for example. The near-field light generating element 32 has a length $H_{NF}$ in the X direction of, for example, 0.5 to 3 μm.

In the vicinity of the near-field light generating element 32, the waveguide 31 has a width $W_{WG}$ in the track width direction (the Y direction) of, for example, 0.3 to 1 μm. In the vicinity of the near-field light generating element 32, the waveguide 31 has a thickness (dimension in the Z direction) $T_{WG}$ of, for example, 0.1 to 1 μm.

As shown in FIG. 2, the distance between the bottom 31g3 of the groove 31g and the edge part 32f of the near-field light generating element 32 will be denoted by the symbol BT. The distance BT falls within the range of 20 to 100 nm, for example. BT may be equal to, smaller than or greater than the depth of the bottom 31g3.

The near-field light generating element 32 is made of a conductive material such as metal. For example, the near-field light generating element 32 may be made of one element selected from the group consisting of Pd, Pt, Rh, Ir, Ru, Au, Ag, Cu and Al, or an alloy composed of two or more of these elements. In particular, the near-field light generating element 32 is preferably made of Ag, Au, or an alloy containing at least one of Ag and Au as a main component.

The waveguide 31 is made of a dielectric material that allows the laser light 35 to pass. Each of the dielectric layers 27, 29, the buffer layer 33 and the clad layer 34 is made of a dielectric material and has a refractive index lower than that of the waveguide 31. The waveguide 31 excluding the incidence end 31a is thus covered with the dielectric material that is lower in refractive index than the waveguide 31. The dielectric layers 27 and 29, the buffer layer 33 and the clad layer 34 may be made of the same material or different materials.

For example, if the laser light 35 has a wavelength of 600 nm and the waveguide 31 is made of $Al_2O_3$ (refractive index n=1.63), the dielectric layers 27 and 29, the buffer layer 33 and the clad layer 34 may be made of $SiO_2$ (refractive index n=1.46). If the waveguide 31 is made of tantalum oxide such as $Ta_2O_5$ (n=2.16), the dielectric layers 27 and 29, the buffer layer 33 and the clad layer 34 may be made of $SiO_2$ (n=1.46) or $Al_2O_3$ (n=1.63).

The adhesion layer 38 is formed by incompletely oxidizing a metal layer. The adhesion layer 38 contains an oxide of the metal that constitutes the metal layer. The adhesion layer 38 is not entirely composed of the oxide of the metal that constitutes the metal layer, but contains both the oxide of the metal that constitutes the metal layer and the metal that constitutes the metal layer. Being formed by incompletely oxidizing a metal layer, the adhesion layer 38 has a resistance-area product higher than that of the metal layer unoxidized and lower than that of a layer that is formed by completely oxidizing the metal layer. A layer formed by completely oxidizing a metal layer refers to a layer that is entirely composed of an oxide of the metal that constitutes the metal layer.

The adhesion layer 38 formed by incompletely oxidizing a metal layer preferably has a resistance-area product higher than or equal to five times that of the metal layer unoxidized, and lower than or equal to one-fifth that of the layer formed by completely oxidizing the metal layer, for the purpose of clear distinction of the adhesion layer 38 from the metal layer unoxidized and the layer formed by completely oxidizing the metal layer.

The adhesion layer 38 is intended to improve the adhesiveness of the near-field light generating element 32 as compared with the case where the near-field light generating element 32 is disposed directly on the buffer layer 33. More specifically, the adhesion layer 38 is a layer that can make the adhesive strength of a layered structure consisting of the buffer layer 33, the adhesion layer 38 and the near-field light generating element 32 in a peel test higher than that of a layered structure consisting of the buffer layer 33 and the near-field light generating element 32 in a peel test. Suppose, for example, that the buffer layer 33 is made of $Al_2O_3$ and the near-field light generating element 32 is made of Ag, Au, or an alloy containing at least one of Ag and Au as a main component. In such a case, a layer that is formed by incompletely oxidizing a metal layer made of Ti, Ta, Sn, or an alloy containing at least one of Ti, Ta and Sn as a main component may be used as the adhesion layer 38 that satisfies the foregoing requirement.

The adhesion layer 38 preferably has a thickness within the range of 0.3 to 2 nm, and more preferably within the range of 0.5 to 1 nm.

As shown in FIG. 6, the edge part 32f of the near-field light generating element 32 includes a coupling part 32f1 that is opposed to the groove 31g of the waveguide 31 with the adhesion layer 38 and the buffer layer 33 therebetween. Surface plasmons are excited on the coupling part 32f1 through coupling with evanescent light that occurs from the interface between the waveguide 31 and the buffer layer 33. Note that surface plasmons may be excited not only on the coupling part 32f1 of the near-field light generating element 32 but also on a part of the outer surface of the near-field light generating element 32 that is in the vicinity of the coupling part 32f1. Here, the length of the coupling part 32f1 will be denoted by BL. The surface plasmons that are excited at least on the coupling part 32f1 of the outer surface of the near-field light generating element 32 propagate along the edge part 32f to reach the near-field light generating part 32g. The near-field light generating part 32g generates near-field light based on the surface plasmons.

BT and BL are important parameters in achieving appropriate excitation and propagation of surface plasmons. BT preferably falls within the aforementioned range of 20 to 100 nm. BL preferably falls within the range of 0.5 to 3 μm. The distance $D_{BF}$ between the end face 31b of the waveguide 31 and the medium facing surface 12a falls within the range of 0 to 2.0 μm, for example.

Reference is now made to FIG. 6 to describe the principle of generation of near-field light by the near-field light generating device 15 and the principle of heat-assisted magnetic recording using the near-field light. The laser light 35 emitted from the laser diode 60 propagates through the waveguide 31 to reach near the buffer layer 33. Here, the laser light is totally reflected at the interface between the waveguide 31 and the buffer layer 33, and this generates evanescent light permeating into the buffer layer 33. Then, this evanescent light and fluctuations of charges in at least the coupling part 32/1 of the outer surface of the near-field light generating element 32 are coupled with each other to induce a surface plasmon polariton mode, whereby surface plasmons are excited on at least the coupling part 32/1 of the outer surface of the near-field light generating element 32.

The surface plasmons 36 excited on at least the coupling part 32/1 of the outer surface of the near-field light generating element 32 propagate along the edge part 32f to reach the near-field light generating part 32g. As a result, the surface plasmons 36 concentrate on the near-field light generating part 32g, and near-field light 37 thus occurs from the near-field light generating part 32g based on the surface plasmons 36. The near-field light 37 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a recording magnetic field produced by the magnetic pole 42 for data recording.

The near-field light generating device 15 according to the present embodiment is capable of converting the laser light that propagates through the waveguide 31 into near-field light with higher light use efficiency, compared with the case where near-field light is generated from a plasmon antenna by directly irradiating the plasmon antenna with laser light. Consequently, according to the present embodiment, it is possible to prevent a part of the medium facing surface 12a from protruding due to conversion of the energy of the laser light into thermal energy in a heat-assisted magnetic recording head.

As previously mentioned, possible shapes of the near-field light generating element 32 are not limited to a triangular prism shape. For example, the near-field light generating element 32 may be tetragonal-prism-shaped. In this case, the cross section of the near-field light generating element 32 parallel to the medium facing surface 12a may be rectangular, or may be trapezoidal such that the width decreases toward the element-forming surface 11c.

An example of the configuration of the magnetic pole 42 will now be described with reference to FIG. 3 to FIG. 5. In this example, the magnetic pole 42 includes a first layer 42A, a second layer 42B and a third layer 42C. As shown in FIG. 4, the first layer 42A has an end face that is located in the medium facing surface 12a at a position forward of the first end face 32a of the near-field light generating element 32 along the Z direction (in other words, located closer to the trailing end). The distance between this end face of the first layer 42A and the first end face 32a preferably falls within the range of 20 to 50 nm. The second layer 42B is disposed on the first layer 42A and touches the top surface of the first layer 42A. The second layer 42B has an end face that is closer to the medium facing surface 12a, and this end face is located at a distance from the medium facing surface 12a. The third layer 42C is disposed on the second layer 42B and touches the top surface of the second layer 42B. The third layer 42C has an end face that is closer to the medium facing surface 12a, and this end face is located at a distance from the medium facing surface 12a. The distance between the end face of the third layer 42C and the medium facing surface 12a is greater than the distance between the end face of the second layer 42B and the medium facing surface 12a.

Next, an example of the configuration of the write shield 43 will be described with reference to FIG. 5 and FIG. 10. In this example, the write shield 43 includes a first layer 43A and a second layer 43B. As shown in FIG. 5, the first layer 43A is separated from the magnetic pole 42 by the gap layer 44 and disposed between the medium facing surface 12a and the respective end faces of the second layer 42B and the third layer 42C of the magnetic pole 42. As shown in FIG. 10, the second layer 43B is disposed on the first layer 43A, the insulating layer 47 and the third layer 42C of the magnetic pole 42. A part of the second layer 43B located near the medium facing surface 12a touches the top surface of the first layer 43A, and another part of the second layer 43B located away from the medium facing surface 12a touches the top surface of the third layer 42C.

The configurations of the magnetic pole 42 and the write shield 43 are not limited to the above-described configurations. For example, the magnetic pole 42 may be composed of one or two layers. The write shield 43 may be composed of one layer or three or more layers.

Figure 11:
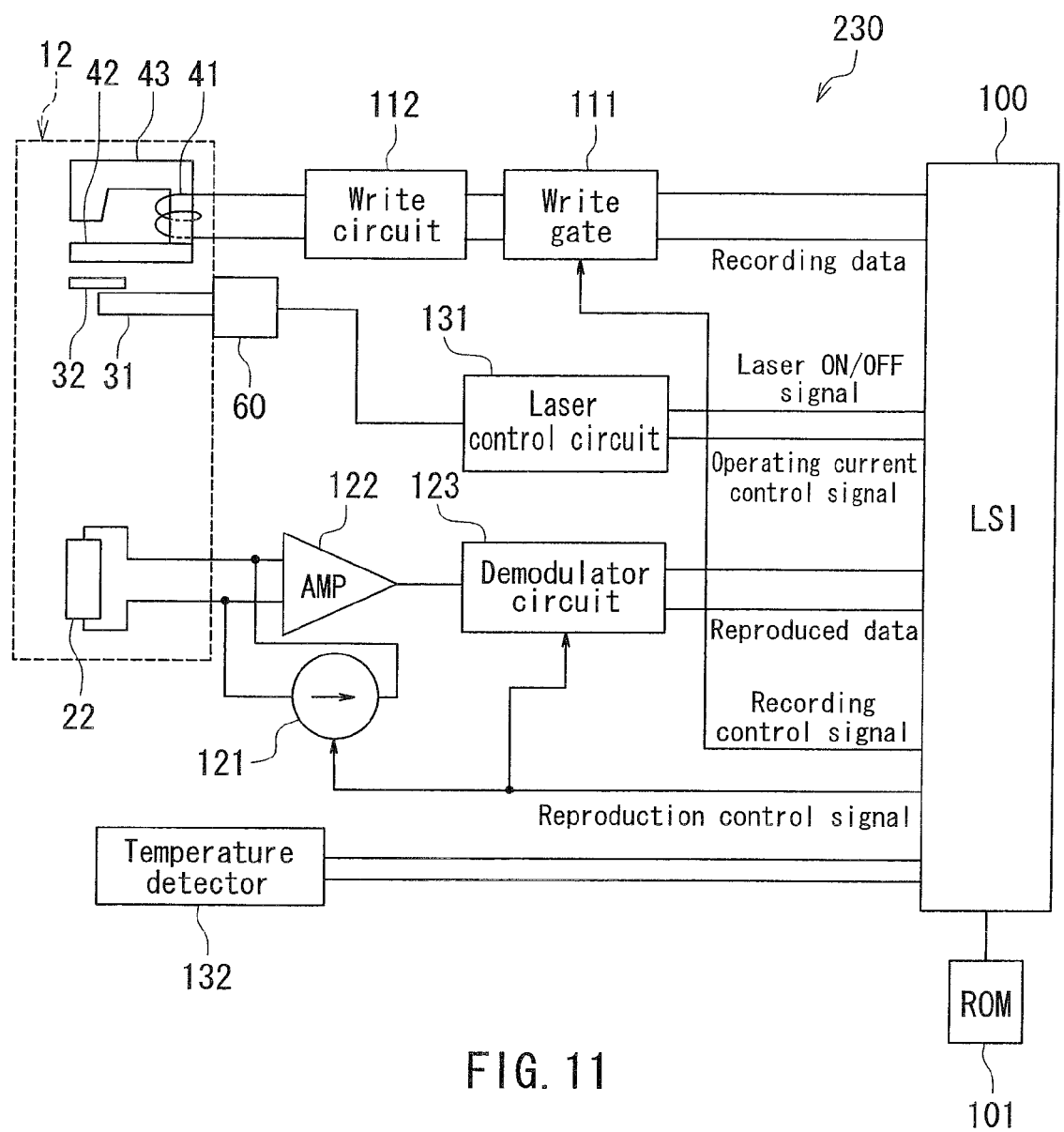
FIG. 11 is a block diagram showing a circuit configuration of the magnetic recording device according to the embodiment of the invention.

Reference is now made to FIG. 11 to describe the circuit configuration of the control circuit 230 shown in FIG. 7 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies recording data and a recording control signal to the write gate 111. The control LSI 100 supplies a reproduction control signal to the constant current circuit 121 and the demodulator circuit 123, and receives reproduced data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a recording operation, the control LSI 100 supplies recording data to the write gate 111. The write gate 111 supplies the recording data to the write circuit 112 only when the recording control signal indicates a recording operation. According to the recording data, the write circuit 112 passes a recording current through the coil 41. Consequently, the magnetic pole 42 produces a recording magnetic field and data is recorded on the magnetic recording layer of the magnetic disk 201 through the use of this recording magnetic field.

In a reproducing operation, the constant current circuit 121 supplies a certain sense current to the MR element 22 only when the reproduction control signal indicates a reproducing operation. The output voltage of the MR element 22 is amplified by the amplifier 122 and input to the demodulator circuit 123. When the reproduction control signal indicates a reproducing operation, the demodulator circuit 123 demodulates the output of the amplifier 122 to generate reproduced data, and supplies the reproduced data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and this laser light propagates through the waveguide 31. According to the principle of generation of near-field light described above, the near-field light 37 occurs from the near-field light generating part 32g of the near-field light generating element 32. The near-field light 37 heats a part of the magnetic recording layer of the magnetic disk 201, thereby lowering the coercivity of that part. When recording, data is recorded by applying the recording magnetic field produced by the magnetic pole 42 to the part of the magnetic recording layer with the lowered coercivity.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 37, and data that indicates the temperature dependence of the coercivity of the magnetic recording layer.

As shown in FIG. 11, the control circuit 230 has the signal system for controlling the laser diode 60, i.e., the signal system consisting of the laser ON/OFF signal and the operating current control signal, independent of the control signal system intended for recording/reproducing operations. This configuration makes it possible to implement various modes of energization of the laser diode 60, not only to energize the laser diode 60 simply in association with a recording operation. It should be noted that the circuit configuration of the control circuit 230 is not limited to the one shown in FIG. 11.

A method of manufacturing the near-field light generating device 15 according to the present embodiment will now be described. The method of manufacturing the near-field light generating device 15 according to the present embodiment includes the steps of forming the waveguide 31; forming the buffer layer 33 on the top surface 31c of the waveguide 31; forming the adhesion layer 38 on the buffer layer 33; and forming the near-field light generating element 32 on the adhesion layer 38. Reference is now made to FIG. 12 to FIG. 16 to describe the method of manufacturing the near-field light generating device 15 according to the present embodiment in detail. FIG. 12 to FIG. 16 each show a cross section of part of a stack of layers formed in the process of manufacturing the near-field light generating device 15.

Figure 12:
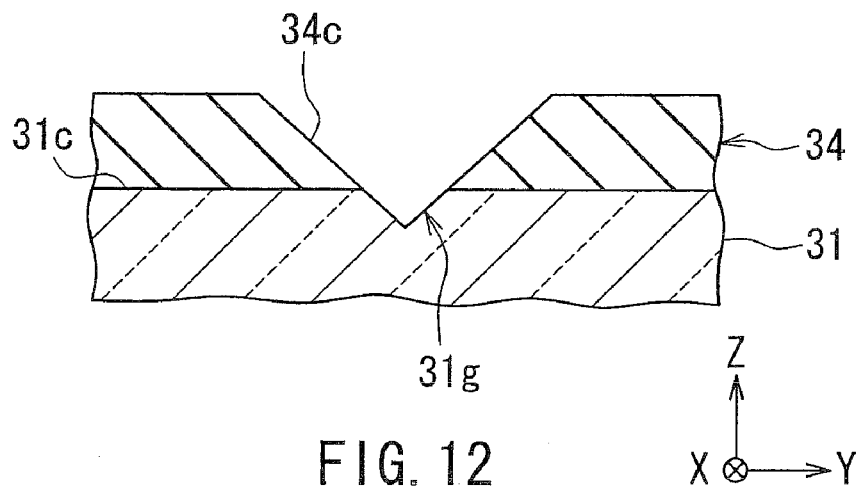
FIG. 12 is an explanatory diagram showing a step of a method of manufacturing the near-field light generating device according to the embodiment of the invention.

FIG. 12 shows a step in the process of manufacturing the near-field light generating device 15. In this step, first, a preliminary waveguide and the dielectric layer 29 (not shown) are formed on the dielectric layer 27 (not shown). The preliminary waveguide is intended to make the waveguide 31 when the groove 31g is formed therein afterward. Next, a dielectric layer is formed over the preliminary waveguide and the dielectric layer 29. The dielectric layer is intended to make the clad layer 34 when the opening 34c is formed therein afterward. The dielectric layer and the preliminary waveguide are then etched to form therein the opening 34c and the groove 31g, respectively, whereby the waveguide 31 and the clad layer 34 are completed. This step corresponds to the step of forming the waveguide 31.

If a part of the dielectric layer 29 is interposed between the end face 31b of the waveguide 31 and the medium facing surface 12a, then the groove 29g of the dielectric layer 29 is formed simultaneously with the formation of the groove 31g in the preliminary waveguide.

Figure 13:
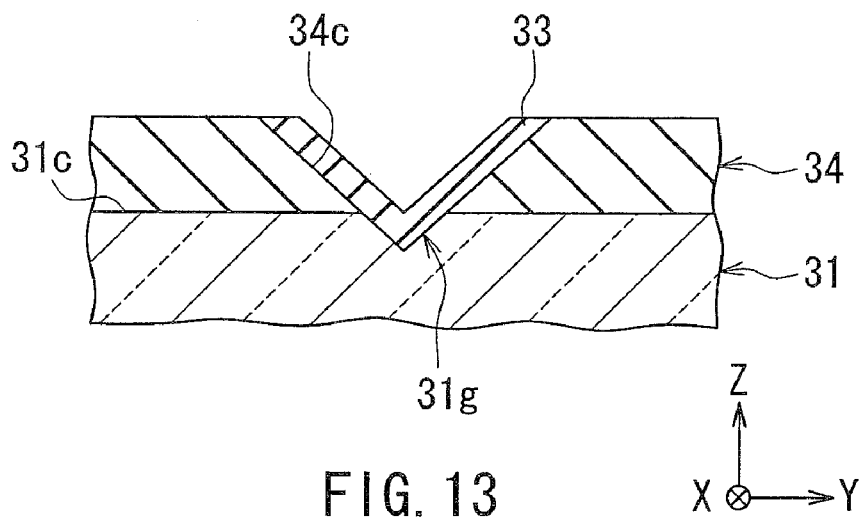
FIG. 13 is an explanatory diagram showing a step that follows the step of FIG. 12.

Next, as shown in FIG. 13, the buffer layer 33 is formed in the groove 31g, the groove 29g (only where it exists) and the opening 34c.

Figure 14:
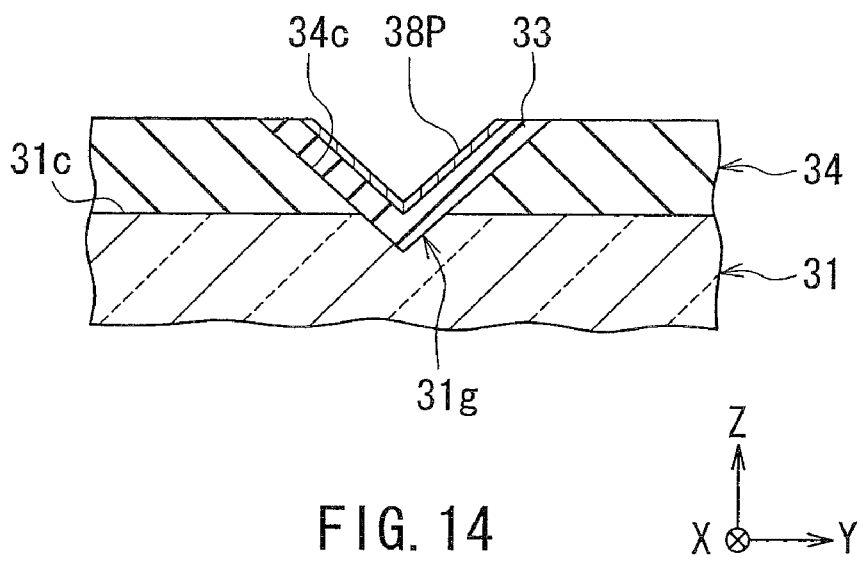
FIG. 14 is an explanatory diagram showing a step that follows the step of FIG. 13.

Next, as shown in FIG. 14, a metal layer 38P, which is intended to make the adhesion layer 38 when incompletely oxidized afterward, is formed on the buffer layer 33 by sputtering, for example. If a layer formed by incompletely oxidizing a metal layer made of Ti, Ta, Sn, or an alloy containing at least one of Ti, Ta and Sn as a main component is intended to be the adhesion layer 38, then the metal layer 38P is formed of Ti, Ta, Sn, or an alloy containing at least one of Ti, Ta and Sn as a main component.

Figure 15:
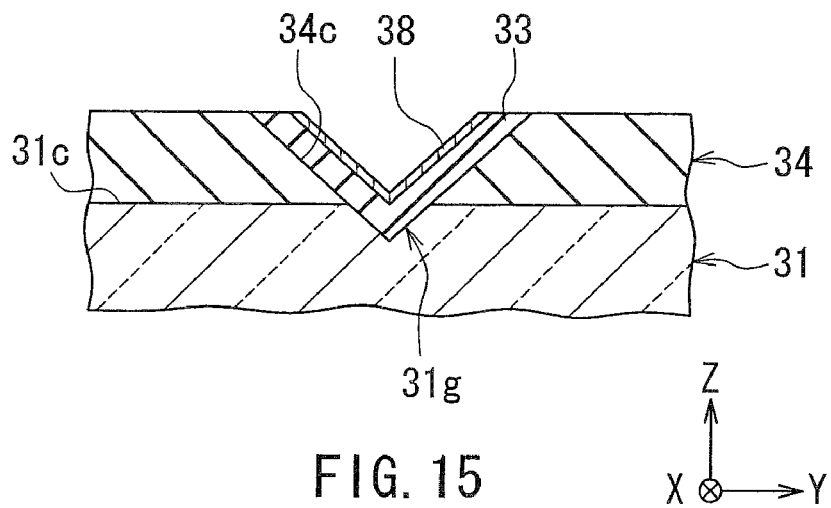
FIG. 15 is an explanatory diagram showing a step that follows the step of FIG. 14.

Next, the metal layer 38P is subjected to incomplete oxidation treatment to oxidize the metal layer 38P incompletely so that the metal layer 38P turns into the adhesion layer 38, as shown in FIG. 15. The incomplete oxidation treatment of the metal layer 38P is intended to oxidize the metal layer 38P only in part so as to form the adhesion layer 38 containing both an oxide of the metal that constitutes the metal layer 38P and the metal that constitutes the metal layer 38P. The incomplete oxidation treatment of the metal layer 38P can be performed, for example, by placing the stack of layers fabricated up to the metal layer 38P into a vacuum chamber and supplying oxygen gas into the vacuum chamber. In this oxidation treatment, at least one of the flow rate of the oxygen gas to be supplied into the vacuum chamber and the duration of the oxidation treatment can be controlled to control the degree of oxidation of the metal layer 38P so as to oxidize the metal layer 38P incompletely.

Figure 16:
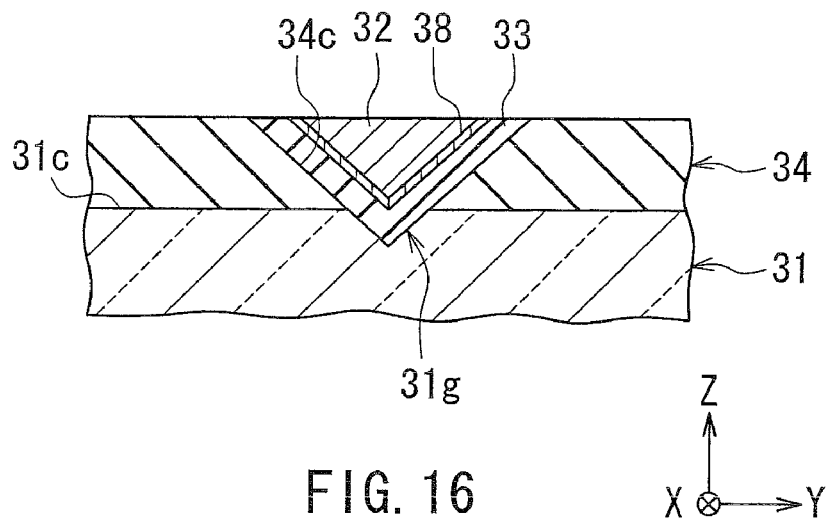
FIG. 16 is an explanatory diagram showing a step that follows the step of FIG. 15.

Next, as shown in FIG. 16, the near-field light generating element 32 is formed on the adhesion layer 38 by sputtering, for example. The clad layer 34, the buffer layer 33, the adhesion layer 38 and the near-field light generating element 32 are then flattened at the top by chemical mechanical polishing (CMP), for example. The near-field light generating device 15 is completed through the series of steps described so far.

As has been described, according to the present embodiment, the near-field light generating element 32 is disposed over the buffer layer 33 with the adhesion layer 38 interposed therebetween. The adhesion layer 38 is formed by incompletely oxidizing a metal layer. The adhesion layer 38 has a resistance-area product higher than that of the metal layer unoxidized and lower than that of a layer that is formed by completely oxidizing the metal layer. A layered structure consisting of the buffer layer 33, the adhesion layer 38 and the near-field light generating element 32 has a peel-test adhesive strength higher than that of a layered structure consisting of the buffer layer 33 and the near-field light generating element 32. According to the present embodiment, it is possible to prevent exfoliation of the near-field light generating element 32 and to suppress a drop in the use efficiency of the light propagating through the waveguide 31 resulting from the adhesion layer as compared with the case where the near-field light generating element 32 is disposed over the buffer layer 33 with an adhesion layer consisting only of metal interposed therebetween. Hereinafter, these advantageous effects will be described in detail with reference to the results of first and second experiments and first and second simulations.

Initially, a description will be given of the first and second experiments. The first and second experiments were conducted to confirm that the adhesive strength of the near-field light generating element 32 can be improved by the configuration in which the near-field light generating element 32 is disposed over the buffer layer 33 with the adhesion layer 38 formed by incompletely oxidizing a metal layer interposed therebetween, as compared with a configuration in which the near-field light generating element 32 is disposed directly on the buffer layer 33.

The first experiment will be described initially. In the first experiment, samples 1 to 4 as described below were fabricated and examined for adhesive strength. For sample 1, a 100-nm-thick Ag layer was formed on the buffer layer 33 of $Al_2O_3$ without any adhesion layer interposed therebetween. For sample 2, a 100-nm-thick Ag layer was formed over the buffer layer 33 of $Al_2O_3$ with an adhesion layer made of a 1.0-nm-thick Ti layer interposed therebetween. For sample 3, a 100-nm-thick Ag layer was formed over the buffer layer 33 of $Al_2O_3$ with an adhesion layer 38 interposed therebetween, wherein the adhesion layer 38 was formed by subjecting a 1.0-nm-thick Ti layer to incomplete oxidation treatment. For sample 4, a 100-nm-thick Ag layer was formed over the buffer layer 33 of $Al_2O_3$ with an adhesion layer 38 interposed therebetween, wherein the adhesion layer 38 was formed by subjecting a 1.0-nm-thick Ti layer to complete oxidation treatment. The complete oxidation treatment of a Ti layer is a treatment by which the Ti layer is oxidized to make a layer entirely composed of an oxide of Ti. The Ag layer in each of samples 1 to 4 corresponds to the near-field light generating element 32. Sample 3 corresponds to the near-field light generating device 15 according to the present embodiment.

The incomplete oxidation treatment of the Ti layer for forming the adhesion layer 38 of sample 3 was performed by placing the layered structure fabricated up to the Ti layer into a vacuum chamber, and supplying oxygen gas into the vacuum chamber at a flow rate of 0.1 sccm (Standard cc/min) for 60 seconds. The complete oxidation treatment of the Ti layer for forming the adhesion layer of sample 4 was performed by placing the layered structure fabricated up to the Ti layer into a vacuum chamber, and supplying oxygen gas into the vacuum chamber at a flow rate of 10 sccm for 600 seconds.

In the first experiment, the adhesion layers of samples 2 to 4 were measured for resistance-area product. The resistance-area products of the adhesion layers were measured by fabricating samples for measurement of resistance-area product as described below and measuring the same under a scanning probe microscope by current in-plane tunneling (CIPT). The samples for measurement of resistance-area product were fabricated by forming a lower electrode made of a stack of a Cu film and a Ta film on a substrate, forming an adhesion layer on the lower electrode, and forming an upper electrode of Cu on the adhesion layer. For the scanning probe microscope, SPM-CIPTech (product name) from CAPRES A/S was used. The following Table 1 shows the forming method for the adhesion layer, the resistance-area product of the adhesion layer, and the permittivity of the adhesion layer in samples 2 to 4. The permittivity of the adhesion layer in sample 2 shows literature data on Ti. The permittivity of the adhesion layer in sample 4 shows literature data on $TiO_2$. The permittivity of the adhesion layer 38 in sample 3 is a value predicted from the value of resistance-area product.

TABLE 1

| Sample | Forming method for adhesion layer | Resistance-area product ($\Omega\text{-}\mu m^2$) | Permittivity Real part | Permittivity Imaginary part |
|---|---|---|---|---|
| 2 | 1.0-nm Ti layer intact | 0.1 | 2.2 | 3.0 |
| 3 | Incompletely oxidizing 1.0-nm Ti layer | 1.1 | 2.5 | 1.7 |
| 4 | Completely oxidizing 1.0-nm Ti layer | 50 | 2.9 | 0.0 |

As shown in Table 1, the adhesion layer 38 of sample 3 which was formed by incompletely oxidizing a metal layer (Ti layer) had a resistance-area product higher than that of the adhesion layer of sample 2 which was the metal layer (Ti layer) unoxidized, and lower than that of the adhesion layer of sample 4 which was formed by completely oxidizing the metal layer (Ti layer).

In the first experiment, the adhesive strengths of samples 1 to 4 were evaluated by three tests, i.e., a peel test, a scratch test and a shear test. The peel test was performed as described below according to a cross cut method. Initially, lattice-like cuts to reach the buffer layer 33 were made in each sample from the Ag-layer side so as to form 25 square areas of 5 mm×5 mm. Next, an adhesive tape was applied to the Ag layer of the sample thus having the cuts, and then the adhesive tape was peeled off. The 25 areas of the sample were checked for the number of areas where no exfoliation occurred at an interface between any two of the layers. The adhesive tape used was one having an adhesion to the Ag layer clearly higher than the adhesion between the buffer layer 33 and the Ag layer in sample 1.

In the scratch test, the top surfaces of the samples were scratched by the tips of tweezers, and the samples were checked for exfoliation at an interface between any two of the layers inside.

Figure 17:
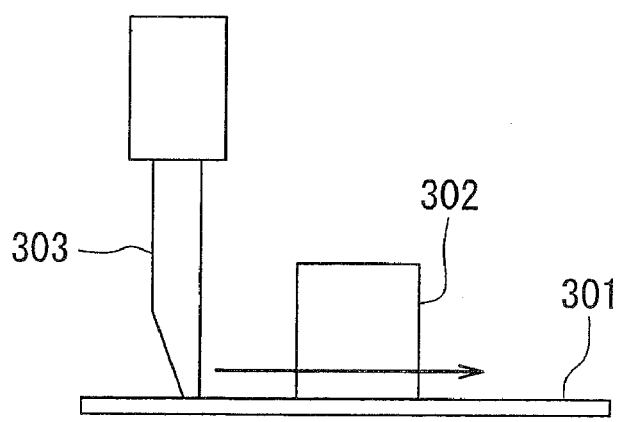
FIG. 17 is an explanatory diagram showing the method of a shear test.

For the shear test, as shown in FIG. 17, a not-shown electrode film of NiFe was initially formed on the top surface of a sample 301 by sputtering, and then a column-like plating layer 302 having a thickness of 20 to 25 µm was formed on the electrode film by plating, whereby a shear test sample was fabricated. Used in the shear test was a measuring unit having a vertically-extending needle-shaped jig (shear tool) 303 and capable of measuring the load applied by the jig 303 to the measurement target. In the shear test, the jig 303 was put into contact with a side of the plating layer 302 and moved in a horizontal direction at constant speed to measure the load applied to the shear test sample when exfoliation occurred at an interface between any two of the layers in the sample 301 (this load is hereinafter referred to as breaking load). In the shear test, each single sample was measured for the breaking load 20 times to determine an average value of the breaking load. The average value thus obtained was defined as exfoliation strength.

The following Table 2 shows the results of the foregoing three tests performed on samples 1 to 4. In Table 2, the denominator of the "number of remaining films" in the peel test shows the number of areas (25) formed in the sample, and the numerator of the "number of remaining films" shows the number of areas where no exfoliation occurred at an interface between any two of the layers out of the 25 areas. In Table 2, "exfoliation" in the scratch test refers to exfoliation at an interface between any two of the layers in the sample.

TABLE 2

| Sample | Adhesion layer | Peel test Number of remaining films | Scratch test | Shear test Exfoliation strength |
|---|---|---|---|---|
| 1 | None | 0/25 | Exfoliation | approx. 4 gf |
| 2 | 1.0-nm Ti layer | 25/25 | No exfoliation | approx. 32 gf |
| 3 | 1.0-nm Ti layer incompletely oxidized | 25/25 | No exfoliation | approx. 25 gf |
| 4 | 1.0-nm Ti layer completely oxidized | 8/25 | Exfoliation | approx. 14 gf |

The results of the peel test indicate that the second and third samples are higher in peel-test adhesive strength than the first and fourth samples. The peel-test adhesive strength of the third sample corresponds to that of the layered structure consisting of the buffer layer 33, the adhesion layer 38 and the near-field light generating element 32. The peel-test adhesive strength of the first sample corresponds to that of the layered structure consisting of the buffer layer 33 and the near-field light generating element 32. Consequently, from the results of the peel test, it can be said that the layered structure consisting of the buffer layer 33, the adhesion layer 38 and the near-field light generating element 32 is higher in peel-test adhesive strength than the layered structure consisting of the buffer layer 33 and the near-field light generating element 32.

From the results of the peel test, the scratch test and the shear test, it can be seen that the layered structure of sample 4 wherein the adhesion layer is formed by completely oxidizing a metal layer (Ti layer) cannot provide a sufficient adhesive strength, whereas the layered structure of sample 3 wherein the adhesion layer is formed by incompletely oxidizing the metal layer (Ti layer) provides a sufficient adhesive strength.

A description will now be given of the second experiment. In the second experiment, samples 5 to 8 as described below were fabricated and examined for adhesive strength. For sample 5, a 100-nm-thick Ag layer was formed over the buffer layer 33 of $Al_2O_3$ with an adhesion layer made of a 1.0-nm-thick Ta layer interposed therebetween. For sample 6, a 100-nm-thick Ag layer was formed over the buffer layer 33 of $Al_2O_3$ with an adhesion layer 38 interposed therebetween, wherein the adhesion layer 38 was formed by subjecting to a 1.0-nm-thick Ta layer to incomplete oxidation treatment. For sample 7, a 100-nm-thick Ag layer was formed over the buffer layer 33 of $Al_2O_3$ with an adhesion layer interposed therebetween, wherein the adhesion layer was formed by subjecting a 1.0-nm-thick Ta layer to complete oxidation treatment. For sample 8, a 100-nm-thick Ag layer was formed over the buffer layer 33 of $Al_2O_3$ with an adhesion layer 38 interposed therebetween, wherein the adhesion layer 38 was formed by subjecting a 1.0-nm-thick Sn layer to incomplete oxidation treatment. The details of the incomplete oxidation treatment and the complete oxidation treatment were the same as in the first experiment.

In the second experiment, the adhesive strengths of samples 5 to 8 were evaluated by a peel test and a scratch test. The details of the tests were the same as in the first experiment. The following Table 3 shows the results of the second experiment.

TABLE 3

| Sample | Adhesion layer | Peel test Number of remaining films | Scratch test |
|---|---|---|---|
| 5 | 1.0-nm Ta layer | 25/25 | No exfoliation |
| 6 | 1.0-nm Ta layer incompletely oxidized | 25/25 | No exfoliation |
| 7 | 1.0-nm Ta layer completely oxidized | 0/25 | Exfoliation |
| 8 | 1.0-nm Sn layer incompletely oxidized | 25/25 | No exfoliation |

From the results of the second experiment, it can be seen that the layered structure consisting of the buffer layer 33, the adhesion layer 38 and the near-field light generating element 32 provides a sufficient adhesive strength also in the case where the adhesion layer 38 is formed by incompletely oxidizing a metal layer made of Ta or Sn, as in the case where the adhesion layer 38 is formed by incompletely oxidizing a metal layer made of Ti.

Although experimental results are not shown, the layered structure consisting of the buffer layer 33, the adhesion layer 38 and the near-field light generating element 32 showed a sufficient adhesive strength also in the case where the adhesion layer 38 was formed by incompletely oxidizing a metal layer made of an alloy containing at least one of Ti, Ta and Sn, as in the case where the adhesion layer 38 was formed by incompletely oxidizing a metal layer made of one of Ti, Ta and Sn.

The layered structure consisting of the buffer layer 33, the adhesion layer 38 and the near-field light generating element 32 showed a sufficient adhesive strength also in the cases where the near-field light generating element 32 was made of Au and where the near-field light generating element 32 was made of an alloy containing at least one of Ag and Au as a main component, as in the case where the near-field light generating element 32 was made of Ag.

Next, a description will be given of the first and second simulations. The first and second simulations show that the present embodiment allows suppression of a drop in the use efficiency of the light propagating through the waveguide 31 resulting from the adhesion layer as compared with the case where the near-field light generating element 32 is disposed over the buffer layer 33 with an adhesion layer consisting only of metal interposed therebetween.

The first simulation will be described initially. In the first simulation, the light use efficiency was determined for each of models 1 to 5 of the near-field light generating device described below. The light use efficiency is defined as $I_{OUT}/I_{IN}$. $I_{IN}$ is the intensity of laser light that is incident on the waveguide 31. $I_{OUT}$ is the intensity of near-field light that occurs from the near-field light generating part 32g of the near-field light generating element 32.

Figure 18:
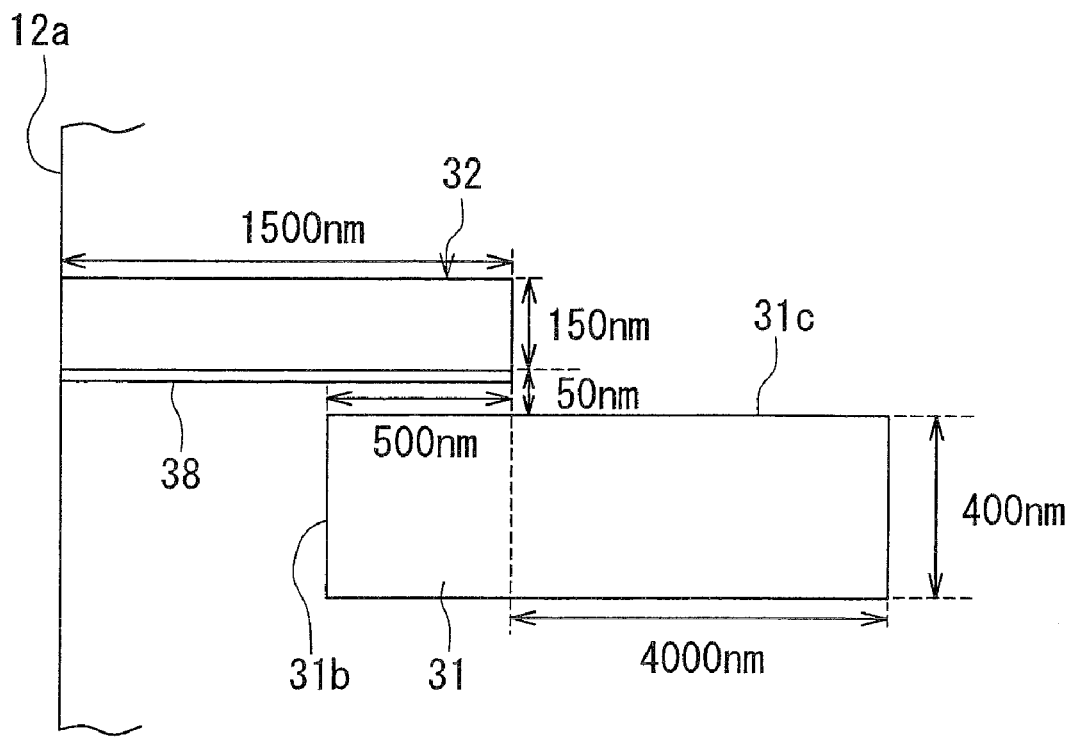
FIG. 18 is a side view of a model of the near-field light generating device used in a first simulation.
Figure 19:
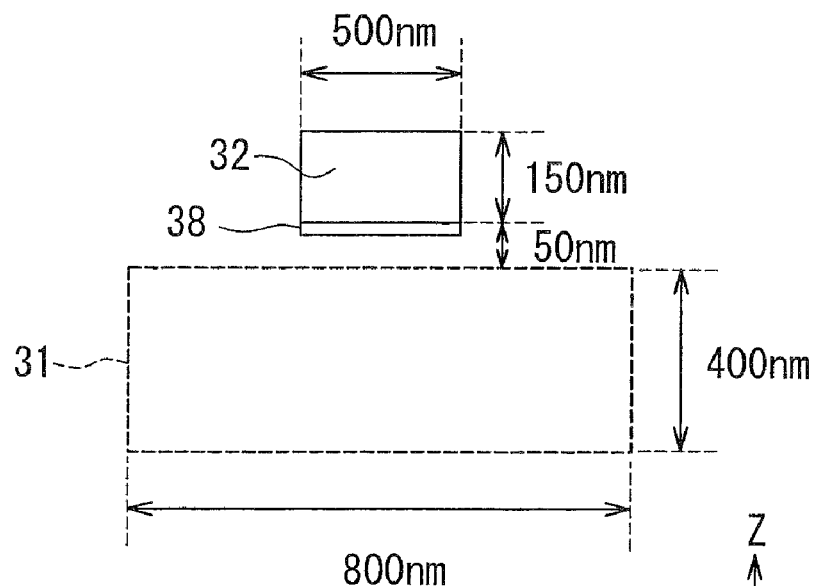
FIG. 19 is a front view of the model of the near-field light generating device shown in FIG. 18.

Reference is now made to FIG. 18 and FIG. 19 to describe models 1 to 5 of the near-field light generating device used in the first simulation. Models 1 to 5 are the same in configuration except the adhesion layer. FIG. 18 and FIG. 19 show the configuration of model 4. FIG. 18 is a side view of model 4. FIG. 19 is a front view of model 4.

For models 1 to 5, the near-field light generating element 32 was shaped into a tetragonal prism. The cross section of the near-field light generating element 32 parallel to the medium facing surface 12a is rectangular. The length of the near-field light generating element 32 in the direction perpendicular to the medium facing surface 12a (the X direction) was set to 1500 nm. The width of the near-field light generating element 32 in the track width direction (the Y direction) was set to 500 nm. The thickness (dimension in the Z direction) of the near-field light generating element 32 was set to 150 nm. The length of the waveguide 31 in the direction perpendicular to the medium facing surface 12a (the X direction) was set to 4500 nm. The width of the waveguide 31 in the Y direction was set to 800 nm. The thickness (dimension in the Z direction) of the waveguide 31 was set to 400 nm. The area for the near-field light generating element 32 and the waveguide 31 to be opposed to each other with the buffer layer 33 therebetween was made to be 500 nm long in the direction perpendicular to the medium facing surface 12a (the X direction), and the distance between the near-field light generating element 32 and the waveguide 31 in this area was set to 50 nm. For models 1 to 5, the end face 31b of the waveguide 31 is located away from the medium facing surface 12a. The top surface 31c of the waveguide 31 does not have the groove 31g. Tantalum oxide was selected as the material of the waveguide 31, Ag was selected as the material of the near-field light generating element 32, and $Al_2O_3$ was selected as the material of the buffer layer 33 and the clad layer 34. The wavelength of the laser light to propagate through the waveguide 31 was set to 650 nm.

Model 1 has no adhesion layer between the buffer layer 33 and the near-field light generating element 32. For model 2, an adhesion layer made of a 1.5-nm-thick Ti layer is interposed between the buffer layer 33 and the near-field light generating element 32. For model 3, an adhesion layer made of a 1.0-nm-thick Ti layer is interposed between the buffer layer 33 and the near-field light generating element 32. For model 4, the adhesion layer 38 formed by incompletely oxidizing a 1.0-nm-thick Ti layer is interposed between the buffer layer 33 and the near-field light generating element 32. For model 5, an adhesion layer formed by completely oxidizing a 1.0-nm-thick Ti layer is interposed between the buffer layer 33 and the near-field light generating element 32.

The following Table 4 shows the light use efficiency for each of models 1 to 5. In Table 4, the light use efficiency of each model is expressed in a relative value with the light use efficiency of model 1 having no adhesion layer as 100. One of the parameters for use in calculating the light use efficiency is the permittivity of the adhesion layer. Differences among models 3 to 5 in light use efficiency are attributable to differences in permittivity of the respective adhesion layers.

TABLE 4

| Model | Adhesion layer | Light use efficiency |
|---|---|---|
| 1 | None | 100 |
| 2 | 1.5-nm Ti layer | 68.2 |
| 3 | 1.0-nm Ti layer | 75.6 |
| 4 | 1.0-nm Ti layer incompletely oxidized | 84.8 |
| 5 | 1.0-nm Ti layer completely oxidized | 90.3 |

As shown in FIG. 4, when compared with model 1 having no adhesion layer, the light use efficiency drops significantly in models 2 and 3 having the adhesion layer made of a Ti layer between the buffer layer 33 and the near-field light generating element 32. In contrast, the light use efficiency drops less in model 4 wherein the adhesion layer 38 formed by incompletely oxidizing a Ti layer is interposed between the buffer layer 33 and the near-field light generating element 32, and in model 5 wherein the adhesion layer formed by completely oxidizing a Ti layer is interposed between the buffer layer 33 and the near-field light generating element 32.

Figure 20:
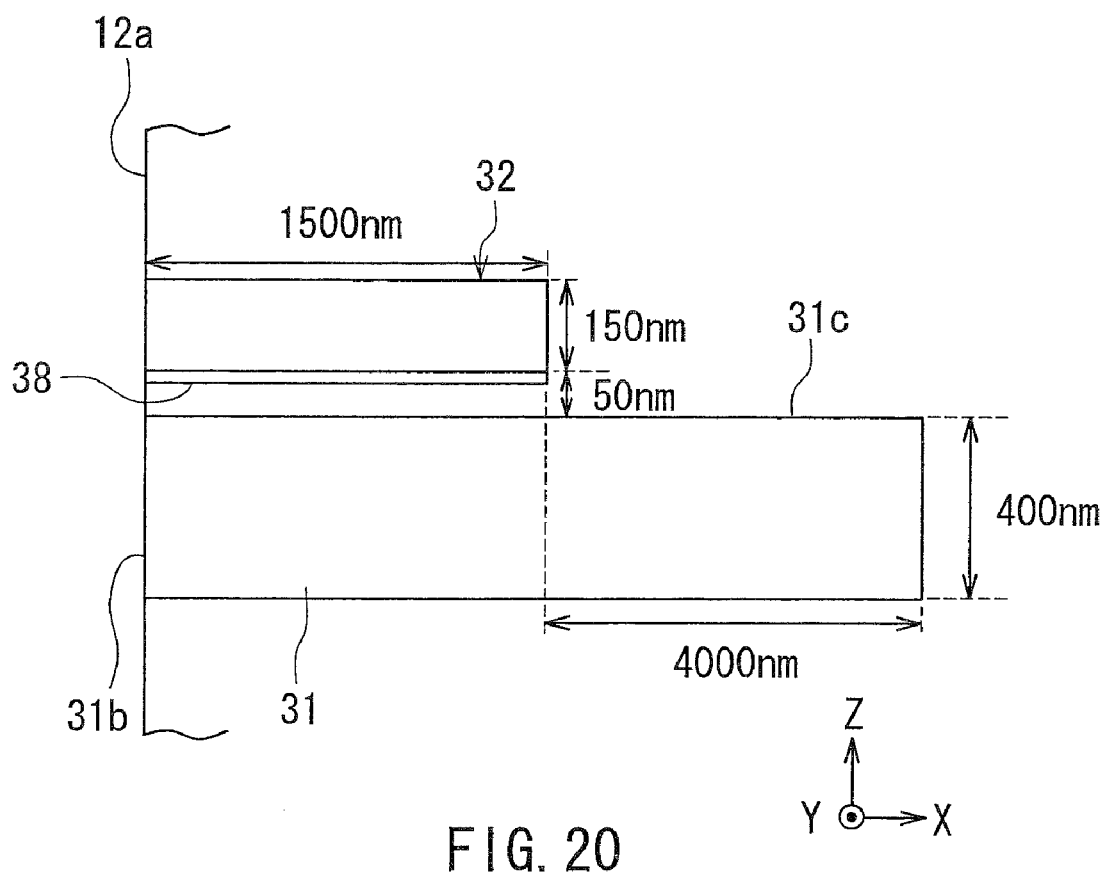
FIG. 20 is a side view of a model of the near-field light generating device used in a second simulation.
Figure 21:
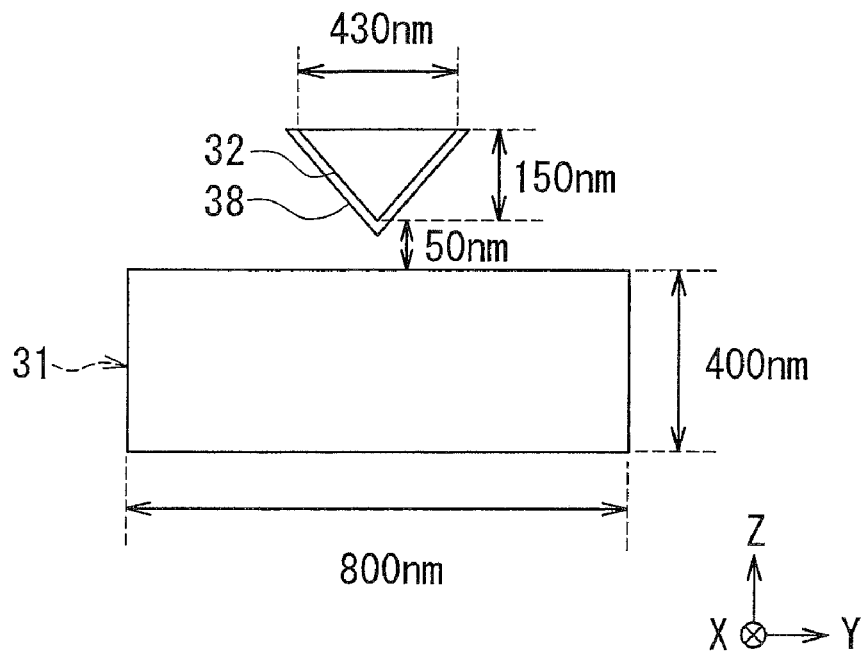
FIG. 21 is a front view of the model of the near-field light generating device shown in FIG. 20.

The second simulation will now be described. In the second simulation, the light use efficiency was determined for each of models 6 to 10 of the near-field light generating device described below. Reference is now made to FIG. 20 and FIG. 21 to describe models 6 to 10 of the near-field light generating device used in the second simulation. Models 6 to 10 are the same in configuration except the adhesion layer. FIG. 20 and FIG. 21 show the configuration of model 9. FIG. 20 is a side view of model 9. FIG. 21 is a front view of model 9.

For models 6 to 10, the near-field light generating element 32 was shaped into a triangular prism. The cross section of the near-field light generating element 32 parallel to the medium facing surface 12a is in the shape of an isosceles triangle with its vertex downward. The length of the near-field light generating element 32 in the direction perpendicular to the medium facing surface 12a (the X direction) was set to 1500 nm. The maximum width of the near-field light generating element 32 in the track width direction (the Y direction) was set to 430 nm. The thickness (dimension in the Z direction) of the near-field light generating element 32 was set to 150 nm. The length of the waveguide 31 in the direction perpendicular to the medium facing surface 12a (the X direction) was set to 5500 nm. The width of the waveguide 31 in the Y direction was set to 800 nm. The thickness (dimension in the Z direction) of the waveguide 31 was set to 400 nm. The area for the near-field light generating element 32 and the waveguide 31 to be opposed to each other with the buffer layer 33 therebetween was made to be 1500 nm long in the direction perpendicular to the medium facing surface 12a (the X direction), and the distance between the near-field light generating element 32 and the waveguide 31 in this area was set to 50 nm. For models 6 to 10, the end face 31b of the waveguide 31 is located in the medium facing surface 12a. The top surface 31c of the waveguide 31 does not have the groove 31g. Tantalum oxide was selected as the material of the waveguide 31, Ag was selected as the material of the near-field light generating element 32, and $Al_2O_3$ was selected as the material of the buffer layer 33 and the clad layer 34. The wavelength of the laser light to propagate through the waveguide 31 was set to 650 nm.

Model 6 has no adhesion layer between the buffer layer 33 and the near-field light generating element 32. For model 7, an adhesion layer made of a 1.5-nm-thick Ti layer is interposed between the buffer layer 33 and the near-field light generating element 32. For model 8, an adhesion layer made of a 1.0-nm-thick Ti layer is interposed between the buffer layer 33 and the near-field light generating element 32. For model 9, the adhesion layer 38 formed by incompletely oxidizing a 1.0-nm Ti layer is interposed between the buffer layer 33 and the near-field light generating element 32. For model 10, an adhesion layer formed by completely oxidizing a 1.0-nm Ti layer is interposed between the buffer layer 33 and the near-field light generating element 32.

The following Table 5 shows the light use efficiency for each of models 6 to 10. In Table 5, the light use efficiency of each model is expressed in a relative value with the light use efficiency of model 6 having no adhesion layer as 100. Differences among models 8 to 10 in light use efficiency are attributable to differences in permittivity of the respective adhesion layers.

TABLE 5

| Model | Adhesion layer | Light use efficiency |
|---|---|---|
| 6 | None | 100 |
| 7 | 1.5-nm Ti layer | 71 |

TABLE 5-continued

| Model | Adhesion layer | Light use efficiency |
|---|---|---|
| 8 | 1.0-nm Ti layer | 75 |
| 9 | 1.0-nm Ti layer incompletely oxidized | 84 |
| 10 | 1.0-nm Ti layer completely oxidized | 87 |

As shown in FIG. 5, when compared with model 6 having no adhesion layer, the light use efficiency drops significantly in models 7 and 8 having the adhesion layer made of a Ti layer between the buffer layer 33 and the near-field light generating element 32. In contrast, the light use efficiency drops less in model 9 wherein the adhesion layer 38 formed by incompletely oxidizing a Ti layer is interposed between the buffer layer 33 and the near-field light generating element 32, and in model 10 wherein the adhesion layer formed by completely oxidizing a Ti layer is interposed between the buffer layer 33 and the near-field light generating element 32.

Note that the foregoing tendencies found in the first and second simulations generally apply to situations where the near-field light generating element 32 is made of Ag, Au, or an alloy containing at least one of Ag and Au as a main component and the adhesion layer 38 is formed by incompletely oxidizing a metal layer that is made of Ti, Ta, Sn, or an alloy containing at least one of Ti, Ta and Sn as a main component.

The results of the first and second experiments and the first and second simulations described so far show the following. If the near-field light generating element 32 is disposed over the buffer layer 33 with an adhesion layer consisting only of metal interposed therebetween, the layered structure consisting of the buffer layer 33, the adhesion layer and the near-field light generating element 32 can provide a sufficient adhesive strength but with a significant drop in the use efficiency of light in the near-field light generating device. If the near-field light generating element 32 is disposed over the buffer layer 33 with an adhesion layer formed by completely oxidizing a metal layer interposed therebetween, it is possible to suppress a drop in the light use efficiency resulting from the adhesion layer; however, the layered structure consisting of the buffer layer 33, the adhesion layer and the near-field light generating element 32 cannot provide a sufficient adhesive strength.

In contrast, according to the near-field light generating device of the present embodiment, the near-field light generating element 32 is disposed over the buffer layer 33 with the adhesion layer 38 formed by incompletely oxidizing a metal layer interposed therebetween. This configuration makes it possible that the layered structure consisting of the buffer layer 33, the adhesion layer 38 and the near-field light generating element 32 provides a sufficient adhesive strength, and also allows suppression of a drop in the light use efficiency resulting from the adhesion layer 38. Consequently, according to the present embodiment, it is possible to prevent exfoliation of the near-field light generating element 32 and to suppress a drop in the use efficiency of the light propagating through the waveguide 31 resulting from the adhesion layer 38 as compared with the case where the near-field light generating element 32 is disposed over the buffer layer 33 with an adhesion layer consisting only of metal interposed therebetween.

The present invention is not limited to the foregoing embodiment, and various modifications may be made thereto. For example, the materials of the waveguide 31, the buffer layer 33, the adhesion layer 38 and the near-field light generating element 32 are not limited to their respective examples shown in the embodiment, and any material may be used as long as the requirements set forth in claims are satisfied.

In the foregoing embodiment, the end face of the magnetic pole 42 (the end face of the first layer 42A) is located in the medium facing surface 12a at a position forward of the end face 32b of the near-field light generating element 32 along the Z direction (in other words, located closer to the trailing end). However, the end face of the magnetic pole 42 may be located backward of the end face 32b of the near-field light generating element 32 along the Z direction (in other words, located closer to the leading end) in the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A near-field light generating device comprising:
   a waveguide that has a top surface and allows light to propagate therethrough;
   a buffer layer that has a refractive index lower than that of the waveguide and is disposed on the top surface of the waveguide;
   an adhesion layer that is formed by incompletely oxidizing a metal layer and is disposed on the buffer layer; and
   a near-field light generating element disposed on the adhesion layer, wherein:
   the adhesion layer has a resistance-area product higher than that of the metal layer unoxidized and lower than that of a layer that is formed by completely oxidizing the metal layer;
   a layered structure consisting of the buffer layer, the adhesion layer and the near-field light generating element has a peel-test adhesive strength higher than that of a layered structure consisting of the buffer layer and the near-field light generating element;
   the near-field light generating element has a coupling part that is opposed to the top surface of the waveguide with the adhesion layer and the buffer layer interposed therebetween, and a near-field light generating part that generates near-field light; and
   a surface plasmon is excited on the coupling part through coupling with evanescent light that occurs from an interface between the waveguide and the buffer layer, the surface plasmon propagates to the near-field light generating part, and the near-field light generating part generates the near-field light based on the surface plasmon.

2. The near-field light generating device according to claim 1, wherein:
   the near-field light generating element is made of Ag, Au, or an alloy containing at least one of Ag and Au as a main component; and
   the adhesion layer is formed by incompletely oxidizing a metal layer that is made of Ti, Ta, Sn, or an alloy containing at least one of Ti, Ta and Sn as a main component.

3. The near-field light generating device according to claim 1, wherein the near-field light generating element has an edge part that includes the coupling part and that is long in one direction, and the near-field light generating part is located at one end of the edge part.

4. A method of manufacturing a near-field light generating device comprising:
   a waveguide that has a top surface and allows light to propagate therethrough;

a buffer layer that has a refractive index lower than that of the waveguide and is disposed on the top surface of the waveguide;

an adhesion layer that is formed by incompletely oxidizing a metal layer and is disposed on the buffer layer; and a near-field light generating element disposed on the adhesion layer, wherein:

the adhesion layer has a resistance-area product higher than that of the metal layer unoxidized and lower than that of a layer that is formed by completely oxidizing the metal layer;

a layered structure consisting of the buffer layer, the adhesion layer and the near-field light generating element has a peel-test adhesive strength higher than that of a layered structure consisting of the buffer layer and the near-field light generating element;

the near-field light generating element has a coupling part that is opposed to the top surface of the waveguide with the adhesion layer and the buffer layer interposed therebetween, and a near-field light generating part that generates near-field light; and a surface plasmon is excited on the coupling part through coupling with evanescent light that occurs from an interface between the waveguide and the buffer layer, the surface plasmon propagates to the near-field light generating part, and the near-field light generating part generates the near-field light based on the surface plasmon, the method comprising the steps of:

forming the waveguide;

forming the buffer layer on the top surface of the waveguide;

forming the metal layer on the buffer layer;

incompletely oxidizing the metal layer so that the metal layer turns into the adhesion layer; and forming the near-field light generating element on the adhesion layer.

5. The method of manufacturing a hear-field light generating device according to claim 4, wherein:

the near-field light generating element is made of Ag, Au, or an alloy containing at least one of Ag and Au as a main component; and the adhesion layer is formed by incompletely oxidizing a metal layer that is made of Ti, Ta, Sn, or an alloy containing at least one of Ti, Ta and Sn as a main component.

6. A heat-assisted magnetic recording head comprising:

a medium facing surface that faces a magnetic recording medium;

a magnetic pole that has an end face located in the medium facing surface and produces a recording magnetic field for recording data on the magnetic recording medium; and the near-field light generating device according to claim 1, wherein:

the near-field light generating part is located in the medium facing surface; and the near-field light generating device generates near-field light that is to be applied to the magnetic recording medium when data is recorded on the magnetic recording medium using the recording magnetic field.

7. The heat-assisted magnetic recording head according to claim 6, wherein:

the near-field light generating element is made of Ag, Au, or an alloy containing at least one of Ag and Au as a main component; and the adhesion layer is formed by incompletely oxidizing a metal layer that is made of Ti, Ta, Sn, or an alloy containing at least one of Ti, Ta and Sn as a main component.

8. The heat-assisted magnetic recording head according to claim 6, wherein the near-field light generating element has an edge part that includes the coupling part and that is long in one direction, and the near-field light generating part is located at one end of the edge part.

9. A head gimbal assembly comprising:

the heat-assisted magnetic recording head according to claim 6; and a suspension that supports the heat-assisted magnetic recording head.

10. A magnetic recording device comprising:

a magnetic recording medium;

the heat-assisted magnetic recording head according to claim 6; and a positioning device that supports the heat-assisted magnetic recording head and positions the heat-assisted magnetic recording head with respect to the magnetic recording medium.

* * * * *